United States Patent [19]
Takahashi et al.
[11] 3,795,876
[45] Mar. 5, 1974

[54] COMPRESSION AND/OR EXPANSION SYSTEM AND CIRCUIT

[75] Inventors: Nobuaki Takahashi, Yamato; Kazunori Nishikawa, Fujisawa; Yukinobu Ishigaki, Yamato; Yasuo Itoh, Tokyo; Yoshitoshi Fujita, Fujisawa, all of Japan

[73] Assignee: Victor Company of Japan, Ltd., Yokohama-City, Kanagawa-ken, Japan

[22] Filed: Apr. 4, 1972

[21] Appl. No.: 241,026

[30] Foreign Application Priority Data

| | | |
|---|---|---|
| Apr. 6, 1971 | Japan | 46/21258 |
| June 7, 1971 | Japan | 46/39987 |
| Oct. 19, 1971 | Japan | 46/82618 |

[52] U.S. Cl. .......... 333/14, 179/1 P, 325/62, 330/86, 330/94, 330/145
[51] Int. Cl. .......... H04b 1/64
[58] Field of Search .. 330/86, 94, 132, 145; 333/14, 333/17; 179/1 F, 1 P; 325/62

[56] References Cited

UNITED STATES PATENTS

| | | | |
|---|---|---|---|
| 3,278,866 | 10/1966 | Bose | 333/17 |
| 3,535,550 | 10/1970 | Kang | 333/14 X |
| 3,304,369 | 2/1967 | Dreyfus | 333/14 X |

*Primary Examiner*—Paul L. Gensler

[57] ABSTRACT

A compression and/or expansion system comprises fixed frequency characteristic changing means having a specific fixed frequency-response characteristic which increases or decreases the level of an input signal in a predetermined frequency band. A variable frequency characteristic changing means has a characteristic which varies so that it approaches a characteristic complimentary with the characteristic of the fixed frequency characteristic change means as the level of the input signal becomes larger and approaches a flat characteristic as the level of the signal becomes smaller. The signal is effectively compressed or expanded according to its level by passing through the fixed and variable frequency characteristic change means.

27 Claims, 37 Drawing Figures

COMPRESSION AND/OR EXPANSION SYSTEM AND CIRCUIT

This invention relates to a compression and/or expansion system and circuit, more particularly, it relates to a system and circuit for reducing noise and improving the signal to noise ratio by using a compressor and an expandor.

A signal transmission system of the type contemplated herein, includes a communication system in which a signal is transmitted and received, and a recording and reproducing system in which a signal is recorded on and reproduced from a recording medium such as a magnetic tape or a record disc. A known method for reducing noise in such a system adopts a compression and expansion system, which employs a compressor and an expandor.

The applicants of the present application have already proposed a compression and expansion system of the following construction, as a co-pending patent application Ser. No. 149,687. A compressor, and a control circuit for controlling the compressor in response to the output of the compressor, are provided on the signal transmission side. An expandor, and a control circuit for controlling the expandor in response to the input to the expandor, are provided on the signal receiving side. The compressor has a variable attenuation network including a control element. The expandor is constructed as a negative feedback amplifier including a control element in its negative feedback loop. If the input signal to the compressor is expressed as X, the output signal of the compressor (i.e. the input signal to the expandor) as Y, the output signal of the expandor as Z, the compression ratio in the compressor as K, the amplification degree of the expandor as A and the feedback ratio as $\beta$, and the relationship between the compression ratio K and the feedback ratio $\beta$ is selected to be $K = \beta$, the relationship between the input and output signals X and Y of the compressor may be expressed by the equation $$Y = KX \quad (1)$$

The relationship between the input and output signals Y and Z may be expressed by the equation $$Z = (AY/1 + A\beta) \quad (2)$$

If a relationship $A >> 1$ is satisfied in the equation (2), the equation (2) may also be expressed as $$Z = (Y/\beta) \quad (3)$$

From the equations (1) and (3) under the condition of $K = \beta$, the relationship between the output of the expandor and the input of the compressor will be $$Z = (KX/\beta) = X \quad (4)$$

Accordingly, an input-output characteristic of the signal in the whole compression and expansion system becomes linear. A noise which occurs in the transmission path can effectively be reduced.

The above described system, however, has a problem since a distortion of signal occurs due to the characteristics of gain control elements provided in the compressor and expandor. This will be explained more in detail hereinbelow. Semiconductor elements (e.g. a transistor and a FET) commonly used as control elements have a characteristic whereby they show a large value of resistance when a control signal voltage is small and a small value of resistance when the control signal voltage is large. On the other hand, a control signal v. resistance characteristic required for the compressor and the expandor is opposite to the above described characteristic of semiconductor elements. Hence, semiconductors by themselves are not suitable for use as the control elements in the compressor and expandor. As a method to overcome this problem, a suitable bias is applied to the base of a transistor. A negative control signal voltage which increases in a negative direction with the level of the signal is applied to the base of the transistor. According to this method, the voltage at the base of the transistor changes in a negative direction as the level of the signal increases and the resistance between its collector and emitter increases.

However, the value of the internal resistance of the semiconductor elements changes greatly when an AC signal voltage is applied across the internal resistance, even if a constant control voltage is applied to the elements. The higher the internal resistance, the larger the change in the value of internal resistance. If a transistor is used in the above described manner, a large AC signal voltage is applied to a portion in which the transistor shows a high internal resistance. As a result, a large distortion occurs in the signal. Further, if a transistor is used in the above described manner, and when the level of the AC signal voltage is low, the variation in the internal resistance is a gradual inclination relative to the variation in the control signal voltage. This characteristic, however, is inconvenient for the control characteristic required for the compressor and the expandor.

In order to overcome these difficulties, a circuit has been proposed which includes a semiconductor element having the aforementioned control signal voltage *v.* internal resistnace characteristic. The semiconductor element is inserted as a control element in one path of a bridge circuit. This circuit, however, tends to introduce a non-linear distortion into the signal, particularly into its low frequency signal component, due to existence of the semiconductor elements in the circuit.

It is, therefore, a general object of this invention to overcome the above described problems and provide novel and useful compression and/or expansion system and circuit.

Another object of the invention is to provide compression and/or expansion system and circuit which are capable of effectively utilizing a characteristic of a control element consisting of a semiconductor which varies its impedance in accordance with a control signal voltage applied thereto. Variable frequency characteristic change means, including control elements, change their characteristic in accordance with a control signal voltage applied thereto. The characteristic approaches a flat characteristic as the level of an input signal becomes smaller, and it departs from the flat characteristic (i.e. increases or decreases) as the level of the signal becomes larger. The system is also provided with a fixed frequency characteristic change circuit which has a fixed characteristic complimentary with the characteristic of the variable frequency characteristic change means when the level of the signal is large. The signal which has passed through these fixed and variable frequency characteristic change circuits has a resultant characteristic which is close to the flat characteristic if the level of the signal is large and is increased or decreased if the level of the signal is small. Thus, compression or expansion is made and noise is effectively reduced.

A further object of the invention is to provide a system and a circuit which divides the whole band into plural frequency bands, in which noise is to be reduced, and compresses or expands the signal by each frequency band. The variable frequency characteristic change circuit corresponding to each frequency band is controlled by a control signal generated by a corresponding control circuit. Each control circuit has filter means the passing band of which is different from the other filter means.

A still further object of the invention is to provide a compressor and expandor which consist of very simple circuits in the frequency division type compression and expansion system.

Other objects and features of the invention will become apparent from the description made hereinbelow with reference to the accompanying drawings, in which.

Figure 1:
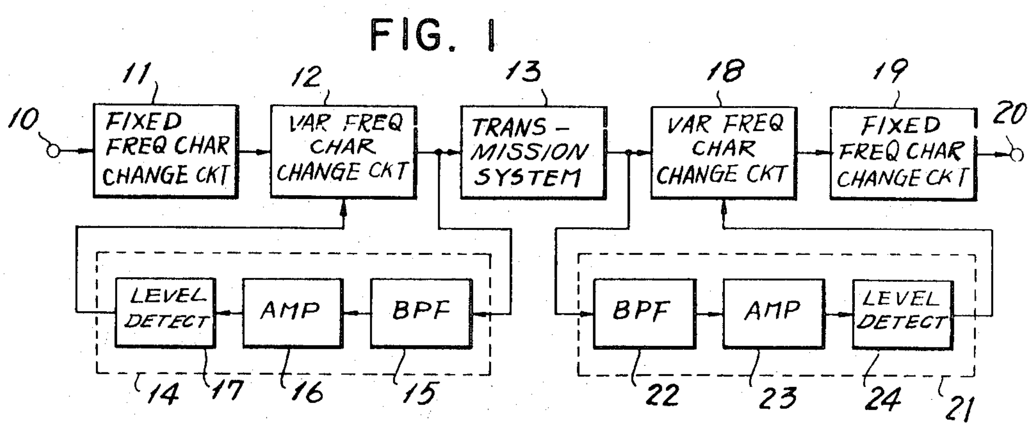
FIG. 1 is a block diagram of a first embodiment of the compression and expansion system, according to the invention.

Referring first to FIG. 1, one preferred embodiment of the compression and expansion system, according to the invention, will be described. On a transmission side (or a recording side), a signal supplied from a signal source to an input terminal 10 is transmitted through a fixed frequency characteristic change circuit 11 and a variable frequency characteristic change circuit 12. The signal is compressed in these circuits. The signal is thereafter transmitted to a recording and reproducing system including a recording medium or a transmission channel 13 (hereinafter referred to as a transmission system). When the transmission system 13 is a recording and reproducing system, the signal is recorded on a recording medium. The output of the frequency characteristic change circuit 12 is also supplied to a control circuit 14 (surrounded by a broken line). The output control voltage signal of the control circuit 14 is applied to the frequency characteristic change circuit 12. The control circuit 14 includes a high-pass filter or a band-pass filter 15, an amplifier 16 and a signal level detection circuit (an envelope detector) 17. The signal, which has passed the filter 15, is amplified in the amplifier 16 and thereafter is supplied to the detection circuit 17. In the detection circuit 17, the envelope of the signal is detected. The output signal voltage of the detection circuit 17 corresponds to the level of the signal having the predetermined band which has passed through the filter 15. This output signal voltage is supplied to the frequency characteristic change circuit 12 as the output control signal voltage of the control circuit 14. The frequency characteristic change variable resistive circuit 12 comprises a circuit having a control element. The variable resistance changes responsive to an application of the control signal voltage to the control element, which is connected in series with a capacitor. When the control signal voltage is applied to the circuit 12, the frequency-response characteristic thereof changes as will be described later. A compressor is composed of the frequency characteristic change circuits 11 and 12 and the control circuit 14.

The frequency characteristic change circuit 11 has a specified frequency response characteristic which is proper to the circuit. As shown by curves $J_1$ and $J_2$ respectively in FIGS. 2A and 3A, the response is more pronounced in a predetermined frequency band. If the transmission system 13 is a recording and reproducing system, such as a magnetic tape device, the fixed characteristic of the frequency characteristic change circuit 11 should preferably be a standardized one.

The frequency characteristic change circuit 12 changes, upon application thereto of a control signal from the control circuit 14. Its frequency-response characteristic varies in accordance with the output control signal of the control circuit 14. The variance is between a characteristic such as that shown by a curve $K_1$ or $K_2$ in FIG. 2A or FIG. 3A and a flat characteristic. The curve $K_1$ or $K_2$ is complementary with the aforementioned characteristic curve $J_1$ or $J_2$. The decreased characteristic $K_1$ or $K_2$ increases and approaches the flat characteristic as the control signal voltage decreases, and decreases its response as the control signal voltage increases. When the control signal voltage is at the maximum, the characteristic $K_1$ or $K_2$ becomes entirely complimentary with the characteristic $J_1$ or $J_2$.

The signal which has been transmitted through the transmission system 13 (or reproduced from the recording medium in case the transmission system is a recording and reproducing system) is expanded through a variable frequency characteristic change circuit 18 and a fixed frequency characteristic change circuit 19 and thereafter appears at an output terminal 20. The signal which has been transmitted through the transmission system 13 is also supplied to a control circuit 21, surrounded by a broken line. The output control signal voltage of the control circuit 21 is applied to the frequency characteristic change circuit 18. The control circuit 21 comprises a high-pass filter or band-pass filter 22, an amplifier 23 and a signal level detection circuit (an envelope detector) 24. Circuit 21 provides a control signal voltage in the same manner as in the control circuit 14. An expandor is composed of the frequency characteristic change circut 18, 19 and the control circuit 21.

Figure 2A:
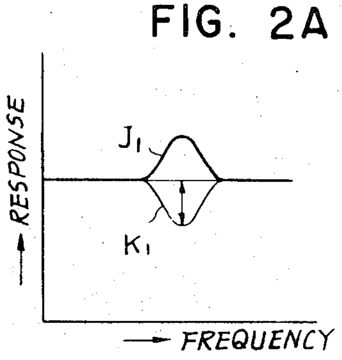
FIGS. 2A and 2B are graphic diagrams showing one embodiment of the frequency-response characteristic of the compressor and the expandor shown in FIG. 1.
Figure 2B:
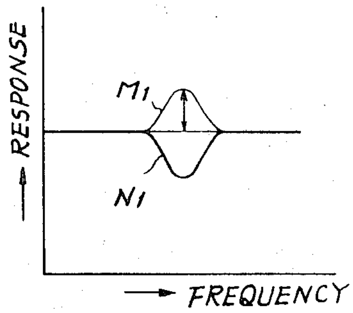
Figure 3A:
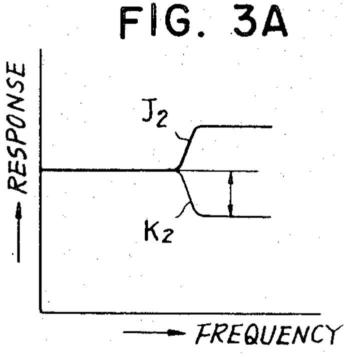
FIGS. 3A and 3B are graphic diagrams showing another embodiment of the frequency-response characteristic of the compressor and the expandor.
Figure 3B:
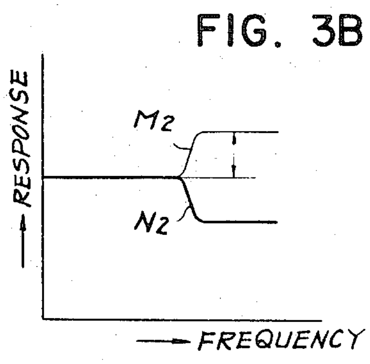

The frequency characteristic change circuit 19 has a predetermined frequency-response characteristic such that the response decreases in a predetermined frequency band as shown by a curve $N_1$ or $N_2$ in FIG. 2B of FIG. 3B respectively. The characteristics $N_1$ and $N_2$ are complimentary with the characteristics $J_1$ and $J_2$ of the frequency characteristic change circuit 11 in the compressor.

The frequency characteristic change circuit 18 is controlled responsive to an application thereto of a control signal from the control circuit 21. Its frequency-response characteristic thus changes in accordance with the output control signal of the control circuit 21. The change is between a characteristic such as is shown by a curve $M_1$ or $M_2$ in FIG. 2B or FIG. 3B. These curves are complimentary with the aforementioned characteristic curve $N_1$ or $N_2$, with respect to a flat characteristic. The characteristic $M_1$ or $M_2$ approaches the flat characteristic as the control signal voltage decreases, and increases the response as the control voltage increases. When the control signal voltage is at the maximum, the characteristic $M_1$ or $M_2$ becomes entirely complimentary with the characteristic $N_1$ or $N_2$.

It will be understood that the frequency band which is the object of compression and expansion by the compressor and expandor is a frequency band in which noise is to be reduced.

The frequency response which is the object of noise reduction in a compressor should be changed from an increasing characteristic to a flat one, in accordance with increase in the level of a signal (when the level of the signal decreases, the reverse is the case). Again, the frequency response which is the object of noise reduction in an expandor should be changed from a decreasing characteristic to a flat one, in accordance with increase in the level of a signal.

The compressor of the circuit, according to the present invention, uses the circuit 11 in which the characteristic $J_1$ or $J_2$ is always reinforced in its response in the frequency band which is the object of noise reduction. In the circuit 12 the characteristic $K_1$ or $K_2$ decreases as the level of the signal increases. Accordingly, the combined frequency characteristic of the circuit 11 and the circuit 12 becomes a characteristic in which response approaches a flat characteristic from a reinforced one, as the level of the signal increases. This characteristic satisfies the aforementioned requirement of the compressor. The expandor uses the circuit 19 in which the characteristic $N_1$ or $N_2$ always decreases the response in the frequency band which is the object of noise reduction. In the circuit 18, the characteristic $M_1$ or $M_2$ increases the response as the level of the signal increases. Accordingly, the combined frequency, characteristic of the circuit 18 and the circuit 19 provides a characteristic in which the response approaches a flat characteristic from a decreasing one, as the level of the signal increases. This characteristic satisfies the aforementioned requirement of the expandor.

It is to be noted that the circuit 12 has the characteristic that the response decreases as the level of the signal increases; whereas the circuit 18 has the characteristic that the response increases as the level of the signal increases. Hence, even if semiconductor elements are used as a control element, any variation in the level of a signal does not cause a distortion in the signal over a desired frequency band. Frequency response can be varied in a desired manner.

Figures 4A, 4B:
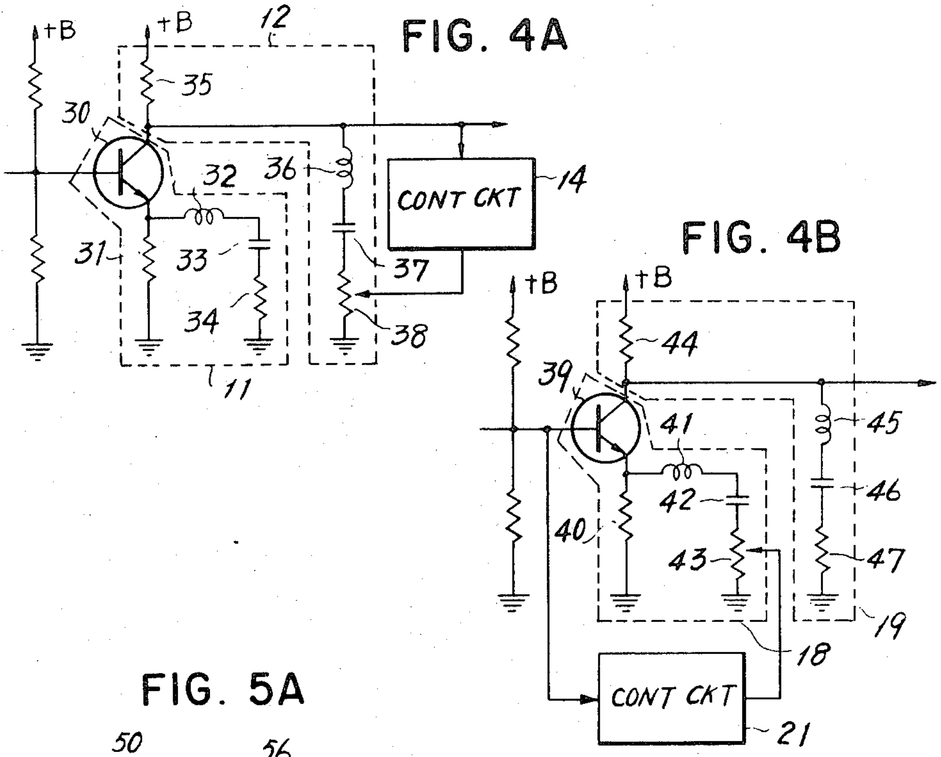
FIGS. 4A and 4B are respectively circuit diagrams of one embodiment of the circuit of the compressor and the expandor shown in FIG. 1.

FIG. 4A shows a concrete embodiment of the electric circuit of a compressor including the frequency characteristic change circuit 11 and 12 which, respectively, have the frequency-response characteristics $J_1$ and $K_1$ shown in FIG. 2A, FIG. 4B shows a concrete embodiment of the electric circuit diagram of the expandor including the frequency characteristic change circuits 18 and 19 which, respectively, have the frequency-response characteristics $M_1$ and $N_1$ shown in FIG. 2B.

In FIG. 4A, the circuit 11 includes a transistor 30, a resistor 31, coil 32, capacitor 33 and resistor 34, respectively, connected to the emitter of the transistor 30. The circuit 12 includes a resistor 35, coil 36, capacitor 37 and variable resistor 38 respectively connected to the collector of the transistor 30. The control circuit 14 is connected between the output line of the collector of the transistor 30 and the slider of the variable resistor 38.

In FIG. 4B, the circuit 18 includes a transistor 39, resistor 40, coil 41, capacitor 42 and variable resistor 43. The circuit 19 includes a resistor 44, coil 45, capacitor 46 and resistor 47, respectively, connected to the collector of the transistor 39. The control circuit 21 is connected between the base of the transistor 39 and the slider of the variable resistor 43. The variable resistors 38 and 43, if equivalently expressed, are control elements of semiconductor devices.

Values of resistance of the resistors 31 (44), 40 (35) and 34 (47) are represented by R*a*, R*b* and R*c*, values of capacitance of the capacitors 33 (46) and 42 (37) by Ca and Cb, values of inductance of the coils 32 (45) and 41 (36) by L$a$ and L$b$, and the minimum values of resistance of the variable resistors 38 and 43 by VRmin respectively. Constant of each circuit element is selected so as to satisfy the equation $$Ra:Rb = Rc:VRmin = Cb:Ca = La:Lb$$

According to the above described construction, the compressor and the expandor operate so that the frequency-response characteristic becomes flat when the level of an input signal exceeds a predetermined signal level at which the values of resistance (values of internal resistance) of the variable resistors 38 and 43 become VRmin. In case the level of the input signal is below the predetermined signal level, the compressor and the expandor operate so that the response is reinforced in the compressor and decreased in the expandor, as the level of the input signal decreases. The frequency band in which the frequency response can vary is determined by the coil 32 and the capacitor 33 or by the coil 41 and the capacitor 42.

Figure 5A:
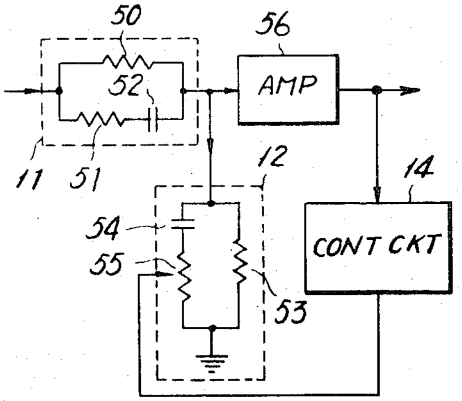
FIGS. 5A and 5B are respectively circuit diagrams of another embodiment of the circuits of the compressor and the expandor shown in FIG. 1.
Figure 5B:
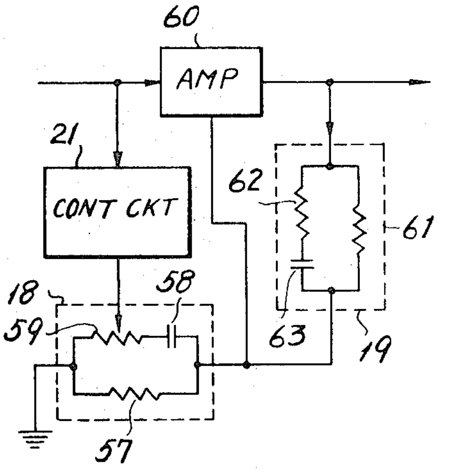

FIG. 5A shows a concrete embodiment of the electrical circuit diagram of the compressor including the frequency characteristic change circuits 11 and 12, which respectively have the frequency-response characteristics $J_2$ and $K_2$ shown in FIG. 3A FIG. 5B shows a concrete embodiment is illustrated in FIG. 5A. A concrete embodiment of the electrical circuit diagram of the expandor including the frequency characteristic change circuits 18 and 19 which respectively have the frequency-response characteristics $M_2$, $N_2$ shown in FIG. 3B.

In FIG. 5A, the circuit 11 includes a resistor 50 which is connected in parallel with a resistor 51, and a capacitor 52. The circuit 12 includes a resistor 53 which is connected in parallel with a capacitor 54 and a variable resistor 55. An amplifier 56 is connected to the output of the circuit 11. The control circuit 14 is connected between the output of the amplifier 56 and the slider of the variable resistor 55.

In FIG. 5B, the circuit 18 includes a resistor 57 which is and a capacitor 58 and a variable resistor 59 which are connected in parallel with a capacitor 58 and a variable resistor 59. The slider of the variable resistor 59 is connected to the control circuit 21. The circuit 19 is connected to the output of an amplifier 60 and includes a resistor 61 which is connected in parallel with a resistor 62 and a capacitor 63, which are connected in parallel with the resistor. The circuits 19 and 18 compose a negative feedback circuit to the amplifier 60. The variable resistors 55 and 59, equivalently expressed, are resistance values of the control elements of semiconductor devices.

Values of resistance of the resistors 50(61), 53 (57) and 51 (62) are represented by R$a$, R$b$ and R$c$, values of capacitance of the capacitors 52 (63) and 54 (58) by Ca and Cb and values of resistance of the variable resistors 55 (59) by VRmin respectively. Constant of each circuit element is selected so as to satisfy the equation;

$$Ra : Rb = Rc : VRmin = Cb : Ca.$$

According to the above construction, the compressor and the expandor operate in the same manner as in the previously described embodiment. The frequency-response characteristic becomes flat when the level of an input signal exceeds a predetermined signal level at which the values of resistance of the variable resistors (i.e. control elements) 55 and 59 become VRmin. If the level of the input signal is below the predetermined signal level, the compressor and the expandor also operate in the same manner as in the previously described embodiment so that response is reinforced in the compressor and is decreased in the expandor.

Figures 6, 7A, 7B, 8A:
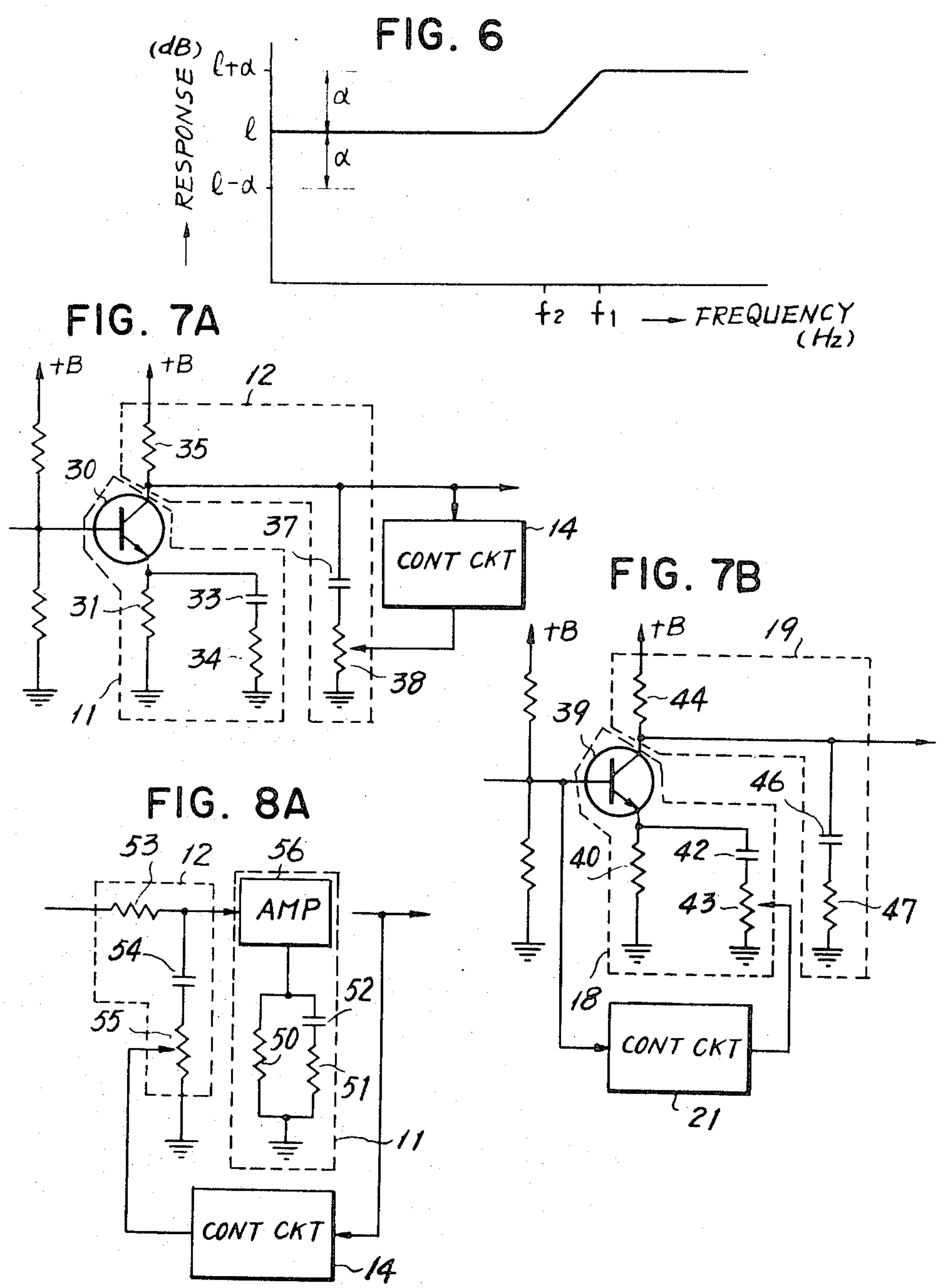
FIG. 6 is a graphic diagram showing a frequency-response characteristic.
FIGS. 7A, 7B and 8A, 8B are respectively circuit diagrams of still another embodiment of the circuits of the compressor and the expandor shown in FIG. 1.

The circuit 11 may be designed to raise the level of a signal in high frequencies, by $\alpha$dB, above the level $l$ of a signal in low frequencies as shown in FIG. 6, and the circuit 12 to lower the level of a signal in high frequencies, by $\alpha$dB, below the level $l$ when the value of resistance of the control element 55 is at the minimum. For these circuits 11 and 12 to reinforce or decrease only the signal components in a required frequency band, the constant of each circuit element in the circuits should be selected in accordance with the following equations:

$$Ra = nRb,\ Rc = nVRmin,$$

$$Cb = nCa,$$

$$f_1 = (1/2\pi Ra \cdot Ca) = (1/2\pi Rb \cdot Cb)$$

$$f_2 = (1/2\pi Rc \cdot Ca) = (1/2\pi VR\ max \cdot Cb)$$

where $f_1$ and $f_2$ are frequencies at inflexion points of the characteristic curve, and n is a coefficient which is about 2 when $\alpha$ is in the order of 10 dB and 4 when $\alpha$ is in the order of 14 dB.

In the circuit 12, the resistor 53 has a resistance value which is $1/n$ of that of the resistor 50. The resistor 53 is connected in parallel with the capacitor 54 and a series control element 55. Consequently, an AC signal voltage applied to the control element 55 is effectively reduced due to existence of the capacitor 54 and the resistor 53. Accordingly, even if the level of the signal applied to the circuit 11 is high, the control element 55 does not introduce any distortion due to the control element 55 is introduced into the signal. The circuit 11 can provide an output of a sufficient signal level to the next stage.

FIG. 7A and FIG. 7B respectively show embodiments of the compressor and the expandor, which eliminate the coils 32, 36, 41 and 45 which are used in the embodiments shown in FIG. 4A and FIG. 4B. In each figure, the same circuit elements are designated by the same reference numerals, and the description thereof will be omitted.

Figure 8B:
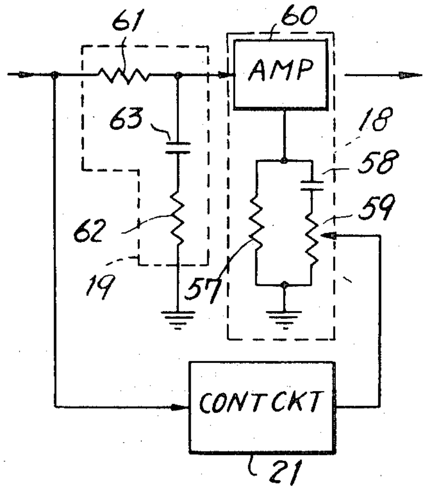

FIG. 8A and FIG. 8B respectively show still other embodiments of the compressor and expandor. In the compressor shown in FIG. 8A, a signal is previously reinforced in its level, in high frequencies, by a circuit 11 including resistors 50 and 51 and a capacitor 52, which are connected in the negative feedback circuit of a negative feedback amplifier 56. The amount of decrease, in the signal level in the high frequency band, can be varied by a circuit 12 including a resistor 53, a capacitor 54 and a control element 55 which are connected to the input of the amplifier 56. In the expandor shown in FIG. 8B, the level of the signal is previously reduced in the high frequencies by a circuit 19 including resistors 61, 62 and a capacitor 63, which are connected to the input of an amplifier 60. The amount of increase in the signal level in the high frequency band can be varied by a circuit 18 including a resistor 57, a capacitor 58 and a control element 59, which are connected in the negative feedback circuit of the amplifier 60.

Figure 9A:
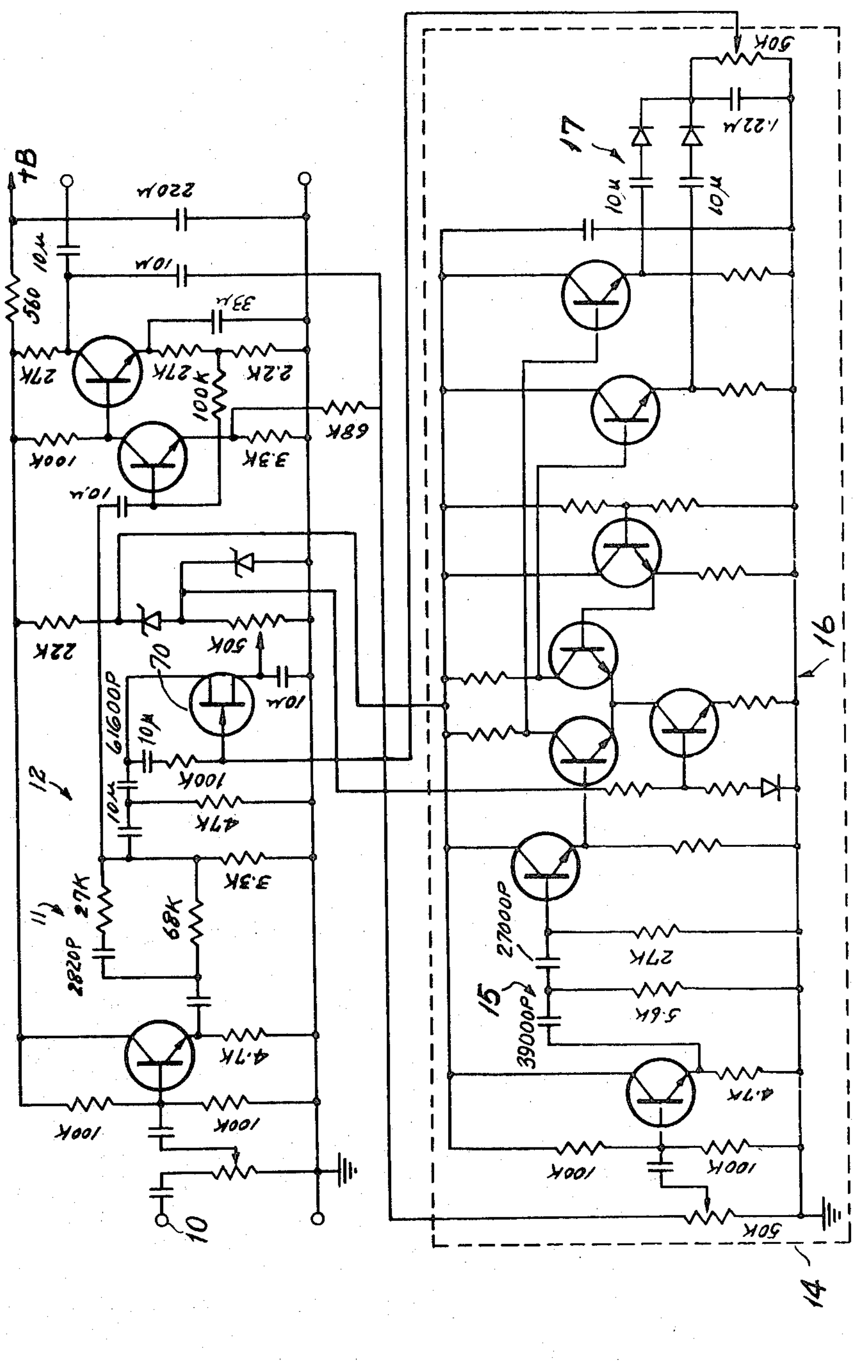
FIGS. 9A and 9B are respectively circuit diagrams of concrete embodiments of the electrical circuits of the compressor and the expandor.
Figure 9B:
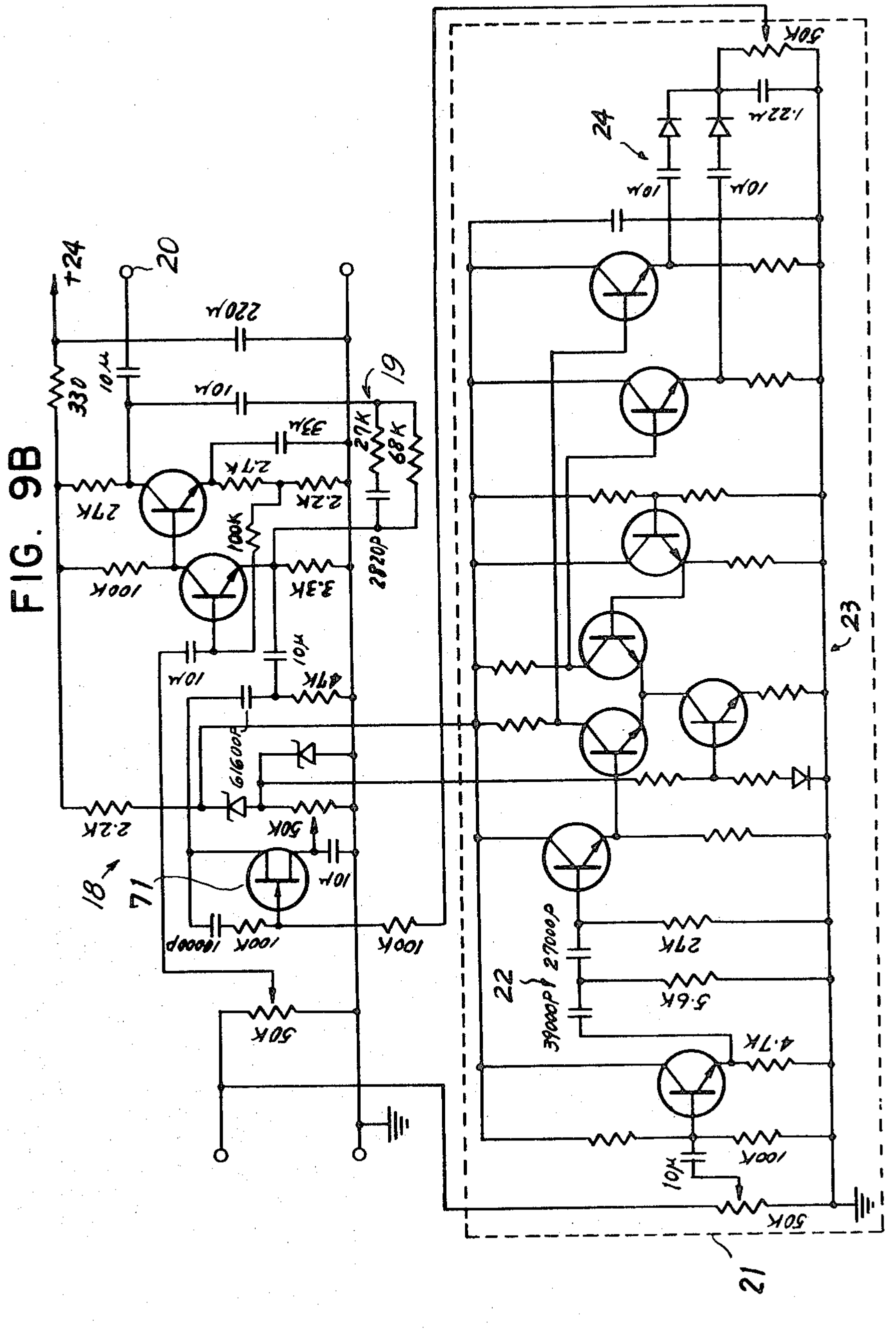

FIG. 9A and FIG. 9B respectively show more detailed embodiments of the electrical circuits of the compressor and the expandor. In these embodiments, field effect transistors (FET) 70 and 71, respectively, are used as control elements. Parts of the circuits corresponding to each block shown in FIG. 1 are designated by the same reference numerals.

In the above described embodiment, the input signal to the control circuit 14 is provided by the circuit 12. This input signal may be obtained from the input to the circuit 11. Again, the input signal to the control circuit 21 may be obtained from the output therefor of the circuit 19 instead of from the input to the circuit 18. Further, the order of connection between the circuits 11 and 12 and that between the circuits 18 and 19 may be reversed.

Next to be described is the second embodiment of the system according to the invention.

If compression and expansion operations are made evenly over a whole frequency band (or a broader frequency band) of a signal, the whole compression and expansion operations are dominated by a signal component of a frequency band having high energy. Consequently, variation in a vertical direction in the noise level of the signal in a frequency band, which is spaced apart in frequency from the frequency band in which the compression and expansion operations are made by the change in the level of the signal, is clearly perceived accoustically. Besides, in order to give a sufficient smoothing effect even to the lowest frequency in the frequency band which is the object of control, and thereby prevent the occurrence of a distortion, the time constant of the smoothing circuit in the control circuit must be selected at a large value. Hence, the response time of the circuit necessarily becomes long resulting in variation in the noise level which is very unpleasant to the ear.

With a view to eliminate this disadvantage, a compression and expansion system of a band division type has been proposed. According to this type of system, an input signal is divided into a plurality of frequency bands. The compression and expansion are made separately with respect to each divided frequency band. There are two types in this band division type compression and expansion system, i.e., a series type and a parallel one.

The series band division type of compression and expansion system includes a plurality of compressors (or expandors) having mutually different operative frequency bands which are connected in series. This system, however, is disadvantageous. A compression (or expansion) characteristic in each compressor (or expandor), in frequencies in the vicinity of the boundary of two adjacent operative frequency bands, appears as a sum of the characteristics of the two compressors (or expandors) connected in series with each other. Moreover, the system tends to make an erroneous operation due to noise. Accordingly, this system is not suitable for use in a high fidelity reproducing apparatus.

A proposal has been made to overcome the above disadvantages of the series type system by connecting, in parallel, a plurality of compressors (or expandors) having mutually different operative frequency bands. This system will be explained more in detail, taking, for example, a construction in which a plurality of compressors (or expandors) each of which is connected in series either with a high-pass filter, a band-pass filter or a low-pass filter are connected in parallel with each other.

Let us assume that an input signal to the compressor has a frequency $f_1$ which is slightly higher than the upper limit cut-off frequency of the low-pass filter, i.e. the lower limit cut-off frequency of the band-pass filter is of a high level. The signal having the frequency $f_1$ is within the passing band of the band-pass filter and out of the passing band of the low-pass filter. Accordingly, this signal, having the frequency $f_1$, is applied as a signal of a high level to the compressor connected to the band-pass filter where it is not subject to a compressing action. Whereas it is also applied as a signal of low level to the compressor connected to the low-pass filter where it is subject to the compressing action. As a result, the signal having the frequency $f_1$ is transmitted to a transmission system as a sum signal of the signal which has been subject to the compressing action and the signal which has not been subject to the compressing action.

The signal having the frequency $f_1$ which has been transmitted through the transmission system, is now subject to an expanding action in the expandor connected to the band-pass filter. This expandor, connected to the band-pass filter, should exercise the expanding action only to the signal which has passed through the compressor connected to the band-pass filter. The expandor actually receives the sum signal of the signal which has not been subject to the compressiong action and the signal which has been subject to the compressing action, as described above. Accordingly, the operation of the compressor connected to the band-pass filter on the compressor side and that of the expandor connected to the band-pass filter on the expandor side do not correspond to each other. This results in an unbalance between the input signal and the output signal in the whole compression and expansion system.

To overcome this problem, it is conceivable to make the cut-off characteristic of each filter steep. The steep cut-off characteristic of each filter, however, causes a difference in delay-time between the filters. This causes a phase error in the signal and a considerable deterioration in a synthetic frequency characteristic of the composite signal of the filtered signals. Besides, it is difficult to design and manufacture a filter which has such a steep cut-off characteristic. Further, if the transmission system is a recording and reproducing system using a record disc or a magnetic disc as a recording medium, the frequency of the reproduced signal varies slightly due to variations in rotational speed or running speed of the recording medium. This causes a signal having a frequency, in the vicinity of the cut-off frequency, to vary between the passing bands of the two filters, due to the aforementioned variation in the speed, even if a filter having a steep cut-off characteristic is successfully designed. Consequently, the input signal and the output signal become entirely different from each other.

Figure 10:
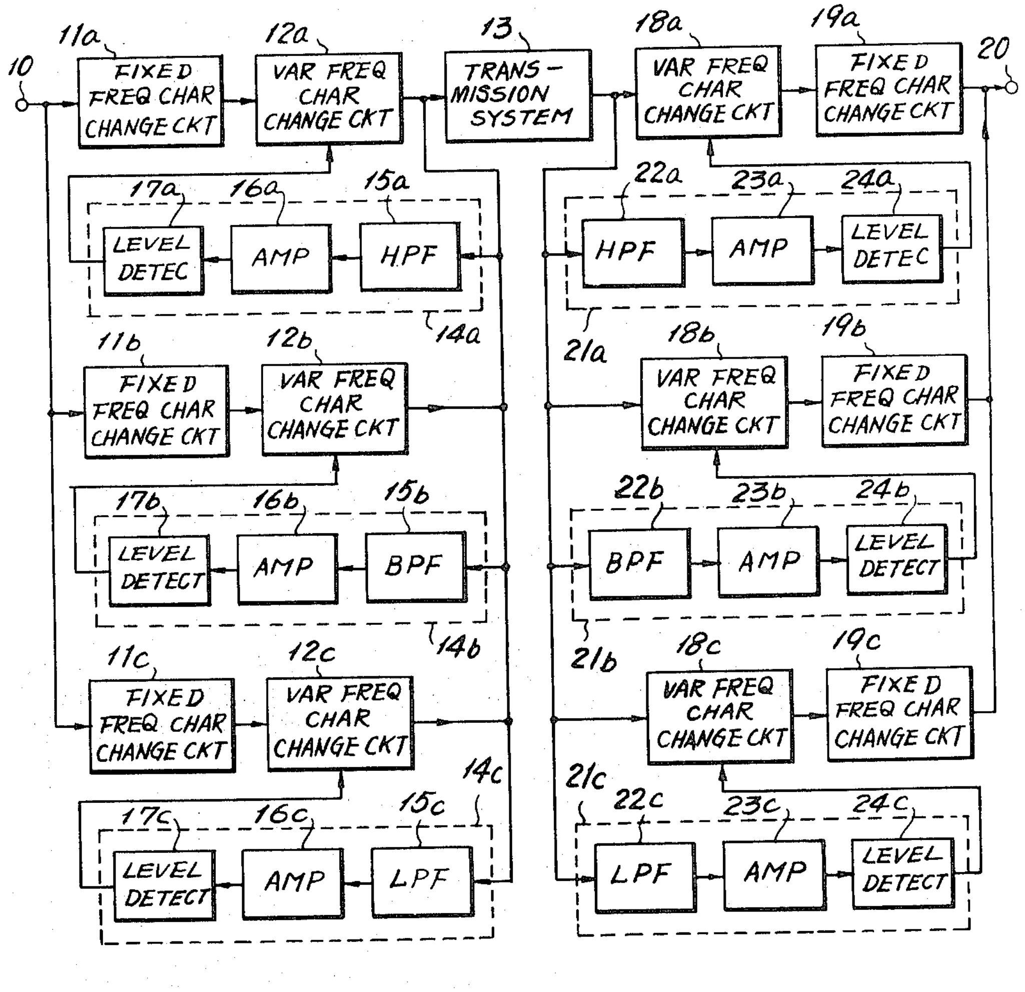
FIG. 10 is a block diagram of a second embodiment of the compression and expansion system according to the invention.

FIG. 10 shows a new band division type of compression and expansion system, which has eliminated the disadvantages of the prior art band division type compression and expansion system, will be described as a second embodiment of the present invention.

Figure 11A:
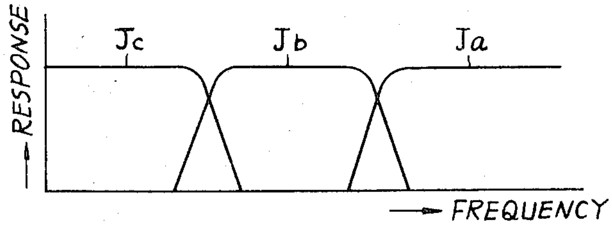
FIGS. 11A, 11B, 11C and 11D are graphic diagrams respectively showing the frequency-response characteristic of each frequency characteristic change circuit shown in FIG. 10.

On the compressor side, a signal from an input terminal 10 is supplied to fixed frequency characteristic change circuit 11*a*, 11*b* and 11*c*. The fixed frequency characteristic change circuits 11a to 11c respectively have, as the fixed frequency characteristic change circuit 11 in the above described first embodiment, specified fixed frequency-response characteristics J*a*, J*b* and J*c* in which response of the respective frequency band which is the object of control is increased as shown in FIG. 11A. The circuit 11*a* may have a characteristic of a high-pass filter, the circuit 11*b* that of a band-pass filter, and the circuit 11*c* that of a low-pass filter.

Figure 11B:
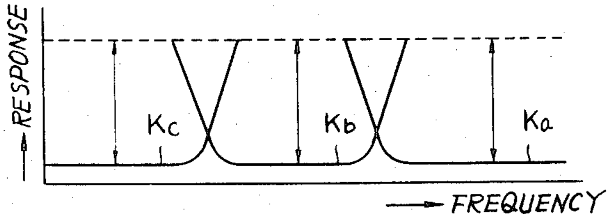

The signal which has passed through the frequency characteristic change circuits 11*a* to 11*c* is supplied separately to variable frequency-charactristic change circuits 12*a*, 12*b* and 12*c*. The frequency characteristic change circuits 12*a* to 12*c* include control elements which change, as those in the variable frequency characteristic change circuit 12. Then impedance changes in response to control signal voltages applied thereto from respective control circuits 14*a*, 14*b* and 14*c*. The frequency characteristic change circuits 12*a* to 12*c* change their frequency-response characteristics by application thereto of the control signal voltages. Their frequency-response characteristics vary in accordance with the output control signals of the control circuits 14*a* to 14*c*. The variances are between flat characteristics and characteristics such as those shown by curves K*a*, K*b* and K*c* in FIG. 11B. The curves K*a* to K*c* are complementary with the aforementioned characteristic curves J*a* to J*c*. The decreased characteristics K*a* to K*c* increase and approach the first characteristics as the control signal voltages decrease. These characteristics decrease their responses as the control signal voltages increase. When the control signal voltages are at a maximum, the characteristics K*a* to K*c* become entirely complementary with the characteristics J*a* to J*c*.

Figure 11C:
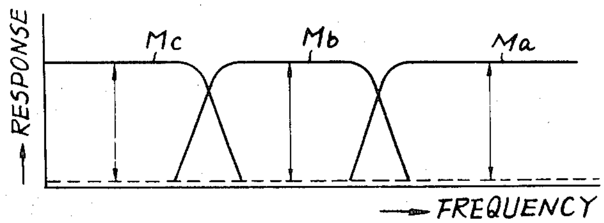

The signals which have been compressed through the frequency characteristic change circuits 12*a* to 12*c* are combined together and transmitted through a transmission system 13 to an expandor. On the expandor side, the signals transmitted through the transmission system 13 are applied to variable frequency characteristic change circuits 18*a*, 18*b* and 18*c*. The frequency characteristic change circuits 18*a* to 18*c* include, as in the variable frequency characteristic change circuit 18 in the first embodiment, control elements which change their impedance in response to the control signal voltages applied from respective control circuits 21*a* to 21*c*. The circuits 18*a* to 18*c* change the characteristics according to the magnitude of the signal level, in a manner opposite to the characteristic change in the frequency characteristic change circuits 12*a* to 12*c* as shown by curves M*a*, M*b* and M*c* in FIG. 11*c*.

Figure 11D:
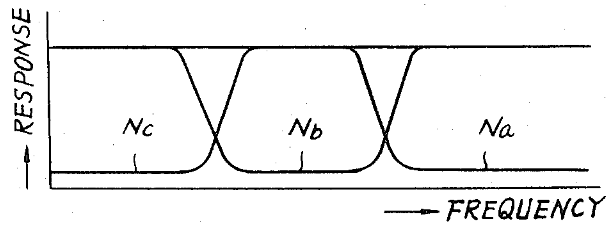

The signals which have passed through the frequency characteristic change circuits 18*a* to 18*c* are separately supplied to fixed frequency characteristic change circuits 19*a*, 19*b* and 19*c*. The frequency characteristic change circuits 19*a* to 19*c* respectively have, as the frequency characteristic change circuit 19 in the first embodiment, specific frequency-response characteristics N*a*, N*b* and N*c* shown in FIG. 11D which are complimentary with the characteristics of the frequency characteristic change circuits 11*a* to 11*c*. Characteristics N*a*, N*b*, N*c* decrease response in the frequency band which is their respective object of control. The signals which have been expanded and restored to the original signals through the circuits 19*a* to 19*c* are combined together and obtained from an output terminal 20.

The control circuits 14*a* to 14*c* on the compressor side respectively include, as does the control circuit 14 in the first embodiment, filters 15*a* to 15*c*, amplifiers 16*a* to 16*c* and rectifying and smoothing circuits 17*a* to 17*c*. The filters 15*a*, 15*b* and 15*c* are a high-pass filter, a band-pass filter and a low-pass filter respectively. The control circuits 21*a* to 21*c* on the expandor side respectively include, as does the control circuit 21 in the first embodiment, filters 22*a* to 22*c*, amplifiers 23*a* to 23*c* and rectifying and smoothing circuits 24*a* to 24*c*. The filters 22*a*, 22*b* and 22*c* are a high-pass filter, a band-pass filter and a low-pass filter respectively.

As described in the foregoing, the control circuits 14*a* to 14*c* and 21*a* to 21*c* are respectively provided with the filters 15*a* to 15*c* and 22*a* to 22*c* which pass a signal within a frequency band which is the object of control. Accordingly, a control signal voltage, composed only of a signal component within the frequency band which is the object of control, is applied to each control element in the frequency characteristic change circuits 12*a* to 12*c* and 18*a* to 18*c*. Therefore, compression and expansion operations are respectively made in each pair of the frequency characteristic change circuits 12*a* and 18*a*, 12*b* and 18*b* and 12*c* and 18*c* within their respective frequency band. These operations are the object of control with respect to the same signal throughout the pair of circuits. Hence, according to the system of the present embodiment, an output signal which is entirely the same as an input signal can be obtained after the compression and expansion operations.

Figure 12A:
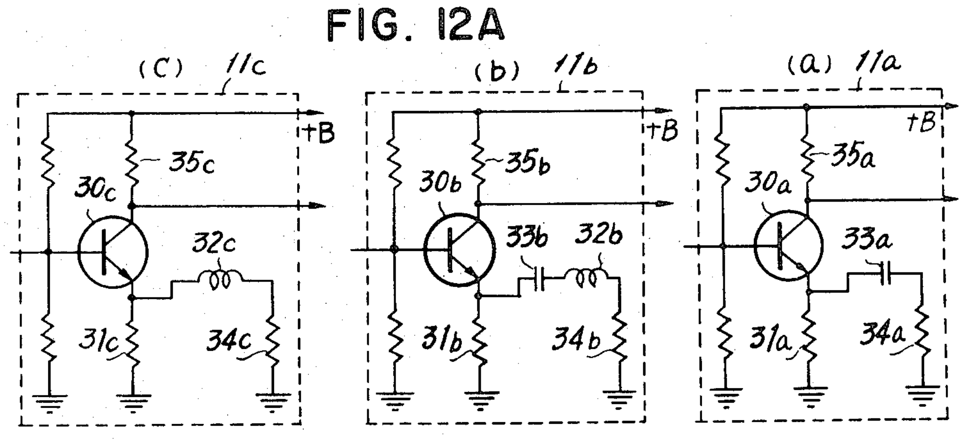
FIGS. 12A to 12D are circuit diagrams showing embodiments of electrical circuits of the frequency characteristic change circuits shown in FIG. 10.

Each embodiment of electrical circuits of the frequency characteristic change circuits 11*a* to 11*c* is shown in FIGS. 12A (*a*) to (*c*). In the circuit 11*a*, a capacitor 33*a* and a resistor 34*a* are connected in parallel with a resistor 31*a*, and to the emitter of a transistor 30*a*. In the circuit 11*b*, a capacitor 33*b*, a coil 32*b* and a resistor 34*b* are connected in parallel with a resistor 31*b*, and to the emitter of a transistor 30*b*. In the circuit 11*c*, a coil 32*c* and a resistor 34*c* are connected in parallel with a resistor 31*c*, and to the emitter of a transistor 30*c*.

Figure 12B:
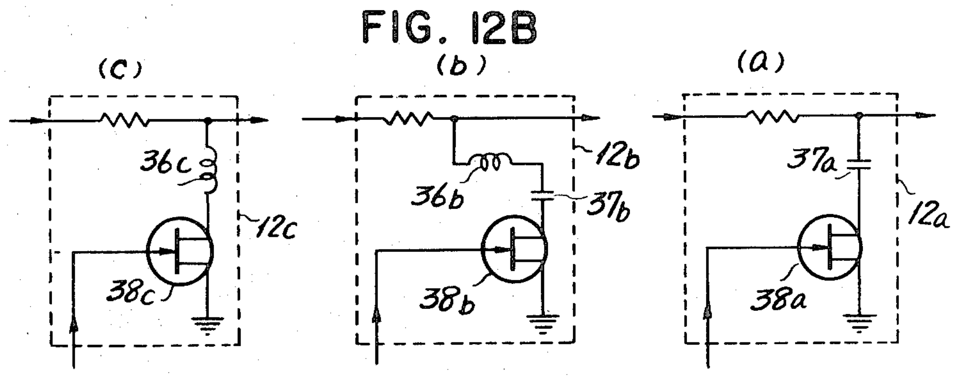
Figure 12C:
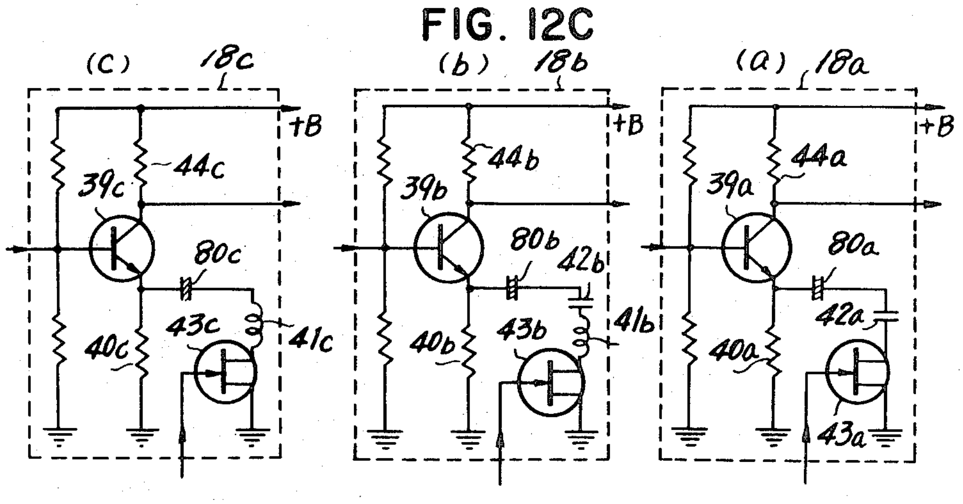

Each embodiment of electrical circuits having the frequency characteristic change circuits 12*a* to 12*c* is shown in FIGS. 12B (a) to (c). In the circuit 12*a*, a capacitor 37*a* is connected to the drain of a FET 38*a*. Similarly, in the circuit 12*b*, a coil 36*b* and a capacitor 37*b* are connected to the drain of a FET 38*b*. In the circuit 12*c*, a coil 36*c* is connected to the drain of a FET 38*c*. Each embodiment of the electrical circuits of the frequency characteristic change circuits 18a to 18c is shown in FIGS. 12C (a) to (c). In the circuit 18a, capacitors 42a and 80a are connected between the drain of a FET 43a and the emitter of a transistor 39a. In the circuit 18b, capacitors 42b and 80b are connected between the drain of a FET 43b and the emitter of a transistor 39b. In the circuit 18c, a coil 41c and a capacitor 80c are connected between the drain of a FET 43c and the emitter of a transistor 39c.

Figure 12D:
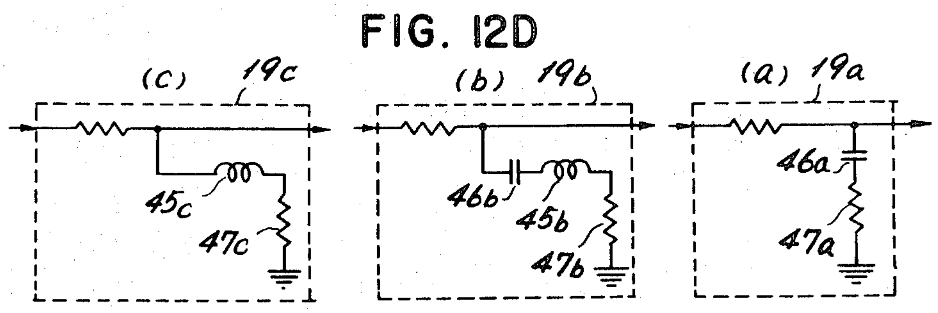

Each embodiment of the electrical circuits of the frequency characteristic change circuits 19*a* to 19*c* is shown in FIGS. 12D (a) to (c). Between an output line and ground are connected a capacitor 46*a* and a resistor 47*a* in the circuit 19*a*, capacitor 46*b*, a coil 45*b* and a resistor 47*b* in the circuit 19*b*, and a coil 45*c* and a resistor 47*c* in the circuit 19*c* respectively.

Figure 13:
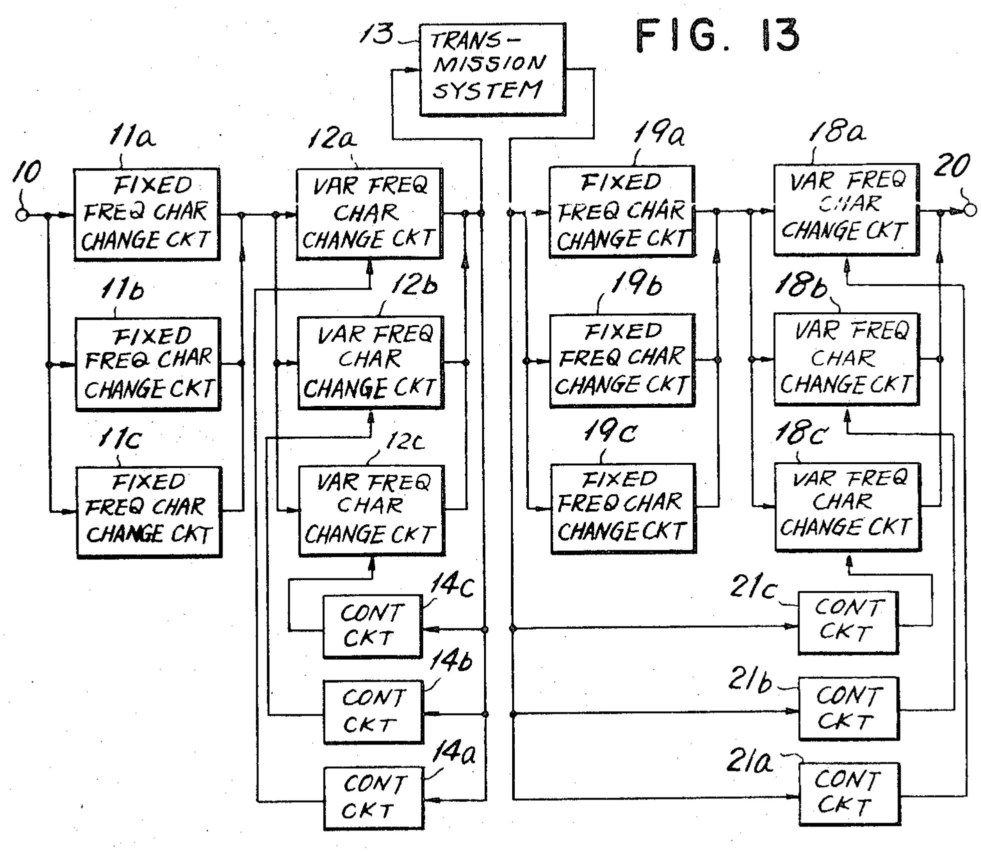
FIG. 13 is a block diagram showing a modification of the second embodiment shown in FIG. 10.

A modification of the block diagram of the embodiment shown in FIG. 10 is illustrated in FIG. 13. In FIG. 13, each block is designated by the same reference characters as used for designating the corresponding block in FIG. 10. On the compressor side, signals which have passed through fixed frequency change circuits 11a to 11c are combined together and thereafter are supplied to each of variable frequency characteristic change circuits 12a to 12c. On the expandor side, the transmitted signals are supplied to fixed frequency characteristic change circuits 19a to 19c and, after passing through these circuits, are combined together and supplied to each of variable frequency characteristic change circuits 18a to 18c. The construction and operation in other respects of this modified embodiment are the same as the embodiment shown in FIG. 10.

Figure 14:
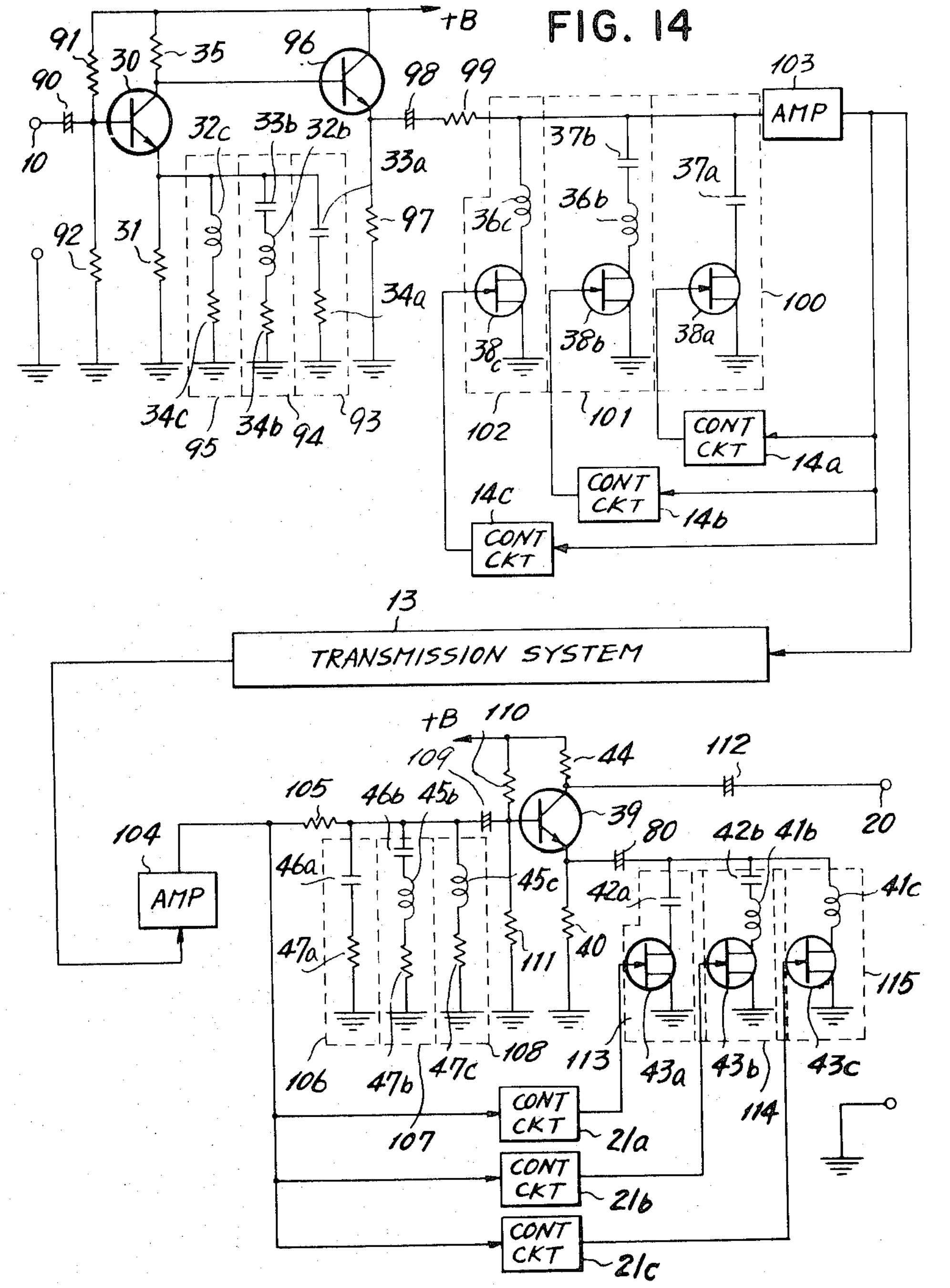
FIG. 14 is a circuit diagram showing one concrete embodiment of the electrical circuit of the block diagram shown in FIG. 13.

One embodiment of a concrete electrical circuit of the block diagram to which the circuits shown in FIGS. 12A to 12D are applied is shown in FIG. 14. In FIGS. 12A through 12D and FIG. 14, the same circuit elements are designated by the same reference characters. A signal from the input terminal 10 is applied to the base of the transistor 30 through a coupling capacitor 90. A suitable bias is applied to the base of the transistor 30 by means of resistors 91 and 92. Between the emitter of the transistor 30 and the ground are parallelly connected a circuit 93 comprising a capacitor 33a, and a resistor 34a connected in series, a circuit 94 comprising a capacitor 33b, a coil 32b and a resistor 34b, a circuit 95 comprising a coil 32c and a resistor 34c connected in series and the emitter resistor 31. The connecting point of the collector of the transistor 30 and the load resistor 35 is connected to the base of a transistor 96 which is an emitter follower configuration.

Three control element circuits 100, 101 and 102 and an amplifying circuit 103 are connected to the connecting point of the emitter of the transistor 96 and an emitter resistor 97 via coupling capacitor 98 and a resistor 99. The control element circuit 100 includes the capacitor 37a and FET 38a. The circuit 101 includes the coil 36b, the capacitor 37b and FET 38b. The circuit 102 includes the coil 36c and FET 38c. The output signal of the amplifier 103 is applied to the control circuits 14a to 14c. The output control signal voltages of the control circuits 14a to 14c are respectively applied to the FETs 38a to 38c of the corresponding control element circuits 100 to 102.

A negative feedback amplifying circuit including the transistor 30 and the circuits 93 to 95 performs the function of the frequency characteristic change circuits 11a, 11b and 11c. Among the circuits including the transistor 30, a parallel circuit of the emitter resistor 31 and the circuit 93 gives the characteristic of the frequency characteristic change circuit 11a (a characteristic of a high-pass filter in the embodiment shown in the figure) to the input-output characteristic of the amplifying circuit including the transistor 30. A parallel circuit of the emitter resistor 31 and the circuit 94 gives it the characteristic of the frequency characteristic change circuit 11b (a characteristic of a band-pass filter in the embodiment shown in the figure). Further, a parallel circuit of the emitter resistor 31 and the circuit 95 gives it the characteristic of the frequency characteristic change circuit 11c (a characteristic of a low-pass filter in the embodiment shown in the figure). Resistors having a relatively high value of resistance are used as the resistors 34a, 34b and 34c. If the resistors 34a to 34c are not used, a parallel resonance will take place due to the reactance elements in the circuits. The provision of the resistors 34a to 34c enables the above described circuits, having the characteristics of the circuits 11a to 11c, to be constructed independently from each other without a mutual interference.

Circuits comprising a resistor 99 connected to the emitter-follower stage of a transistor 96, operating as a low impedance signal source, and each of control element circuits 100 to 102 perform the function as the frequency characteristic change circuits 12a to 12c of the block diagram shown in FIG. 13. A variable attenuation network including the resistor 99 and the control element circuit 100 has the characteristic of the frequency characteristic change circuit 12a. The variable attenuation network including the resistor 99 and the control element circuit 101, and the resistor 99 and the control element circuit 102, respectively, have the characteristics of the frequency characteristic change circuits 12b and 12c.

If the value of resistance of the load resistor 35 and that of the emitter resistor 31 are selected to have equal values, the gain of the amplifying circuit of the transistor 30 (in the case wherein only the emitter resistor 31 is provided in the emitter circuit of the transistor 30) becomes one (1). The values of resistance of the resistors 31, 34a, 34b, 34c and 99 are represented by R1, R2, R3, R4 and R5. The values of the inductance of the coils 32b, 32c, 36b and 36c are represented by L1, L2, L3 and L4. The values of the capacitance of the capacitors 33a, 33b, 37a and 37b by C1, C2, C3 and C4. The minimum values of the resistance of the control elements 38a, 38b and 38c, are controlled by the control signal voltages by X1Rmin, X2Rmin and X3Rmin respectively. The desired characteristics may be given to the circuits 11a to 11c and 12a to 12c by causing the circuit elements to have the following relationship between them:

$$(R5/R1) = (L4/L2) = (X3Rmin/R4) = (C2/C4) = (L3/L1) = (X2Rmin/R3) = (C1/C3) = (X1Rmin/R2) = \text{constant}$$

The signal compressed in the circuit of the above construction is obtained from an amplifier 103 and transmitted to a transmission system 13. The signal transmitted through the transmission line 13 is supplied to an amplifier 104 in the expandor where it is amplified. The output signal of the amplifier 104 is supplied to control circuits 21a to 21c and also to a circuit 106–110 (to be described later), via a resistor 105.

A circuit 106 includes a capacitor 46a and a resistor 47a connected in series, and a resistor 105 to provide the frequency characteristic change circuit 19a of the block diagram shown in FIG. 13. A circuit 107 includes a capacitor 46b, a coil 45b, and a resistor 47b connected in series, and the resistor 105, act together to provide the frequency characteristic change circuit 19b. Further, a circuit 108 includes a coil 45c, and a resistor 47c connected in series, and the resistor 105 which interact to provide the frequency characteristic change circuit 19c. The reason for provision of the resistors 47a to 47c is the same as in the case of the resistors 34a to 34c.

The signal which has passed through the above described circuits is applied to the base of a transistor 39 via a capacitor 109. A suitable bias is applied by resistors 110 and 111 to the base of the transistor 39. To the collector of the transistor 39 is connected the load resistor 44. To the emitter thereof is connected the emitter resistor 40. The output signal is applied through a capacitor 112 from the connecting point of the transistor 39 and the load resistor 44 through a capacitor 112 to the output terminal 20.

Control element circuits 113 to 115 are connected through a capacitor 80 to the connecting point of the emitter of the transistor 39 and the emitter resistor 40. The control circuit 113 includes a capacitor 42a and a FET 43a. The circuit 114 includes a capacitor 42b, a coil 41b and a FET 43b. The circuit 115 includes a coil 41c and a FET 43c. A control signal voltage is applied to the FETs 43a to 43c of the control element circuits 113 to 115 by the control circuits 21a to 21c. A parallel circuit of the emitter resistor 40 and the control element circuit 113 provides the frequency characteristic change, of circuit 18a shown in FIG. 13, to the input-output characteristic of the amplifying circuit of the transistor 39. Similarly, a parallel circuit of the resistor 40 and the circuit 114 gives it the characteristic of the circuit 18b, and a parallel circuit of the resistor 40 and the circuit 115, the characteristic of the circuit 18c.

If the values of resistance of the resistors 105, 47a, 47b, 47c and 40 are represented by R6, R7, R8, R9 and R10. The values of inductance of the coils 45b, 45c, 41b and 41c are represented by L5, L6, L7 and L8. The values of capacitance of the capacitors 46a, 46b, 42a and 42b are represented by C5, C6, C7 and C8. The minimum values of resistance of the control elements 43a, 43b and 43c are represented by X4Rmin, X5Rmin and X6Rmin respectively. Desired characteristics may be given to the circuits 19a to 19c and 18a to 18c by causing the circuit elements to have the following relationship between them:

$$(R10/R6) = (C5/C7) = (X4Rmin/R7) = (C6/C8) = (L7/L5) = (X5Rmin/R8) = (L8/L6) = (X6Rmin/R9) = \text{constant}$$

Again, the relationships between the circuit element constants in this expandor and the circuit element constants in the above described compressor are as follows:

$$\begin{aligned} &R1 : R5 : R6 : R10 \\ &= L2 : L4 : L6 : L8 \\ &= R4 : X3Rmin : R9 : X6Rmin \\ &= (1/C2) : (1/C4) : (1/C6) : (1/C8) \\ &= L1 : L3 : L5 : L7 \\ &= R3 : X2Rmin : R8 : X5Rmin \\ &= (1/C1) : (1/C3) : (1/C5) : (1/C7) \\ &= R2 : X1Rmin : R7 : X4Rmin \end{aligned}$$

Figure 15:
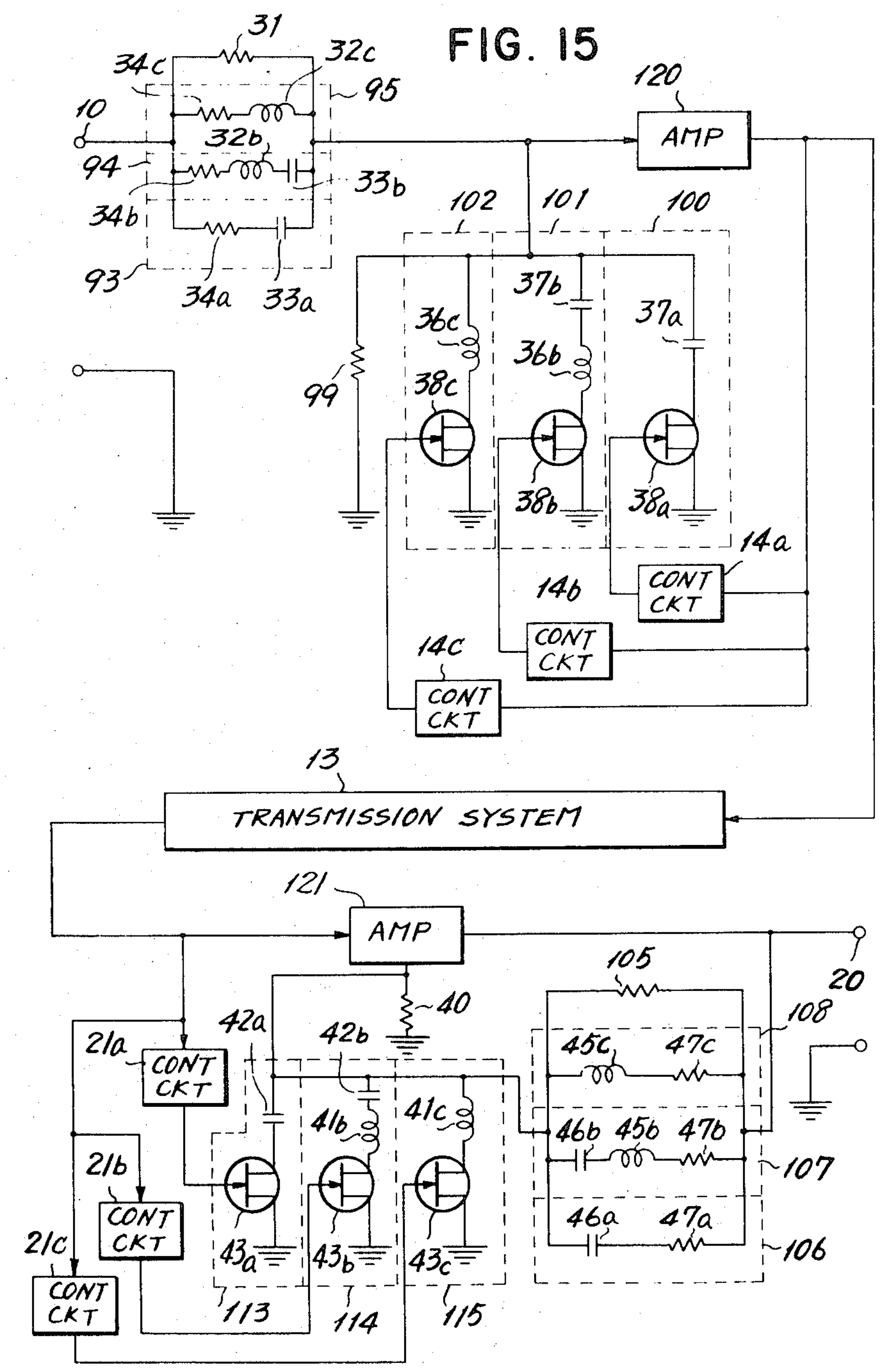
FIG. 15 is a circuit diagram showing another concrete embodiment of the electrical circuit of the block diagram shown in FIG. 13.

FIG. 15 shows a modification of the circuit shown in FIG. 14. In FIG. 15, the same circuit elements as those shown in FIG. 14 are designated by the same reference characters. In the present embodiment, the transistors 30, 96 and 39 etc. which are used in the circuit shown in FIG. 14 are not used. In the compressor, circuits 100 to 102 are provided in a negative feedback loop of a negative feedback amplifier 120. In the expandor, a circuitry which is composed of circuits 106 to 108 are circuits 113 to 115 is provided in a negative feedback loop of a negative feedback amplifier 121. The selection of the circuit element constants is made in the same manner as in the circuit shown in FIG. 14.

The second embodiment of the invention eliminates the need for the circuit having a steep cut-off characteristic, required in the prior art band division type of compression and expansion system. Besides, since irregularities in the constants of the circuit elements do not affect the frequency characteristic so much, this circuit is particularly advantageous when it finds application in a reproducing apparatus for four channel records, which requires interchangeability between many reproducing apparatus.

Figure 16:
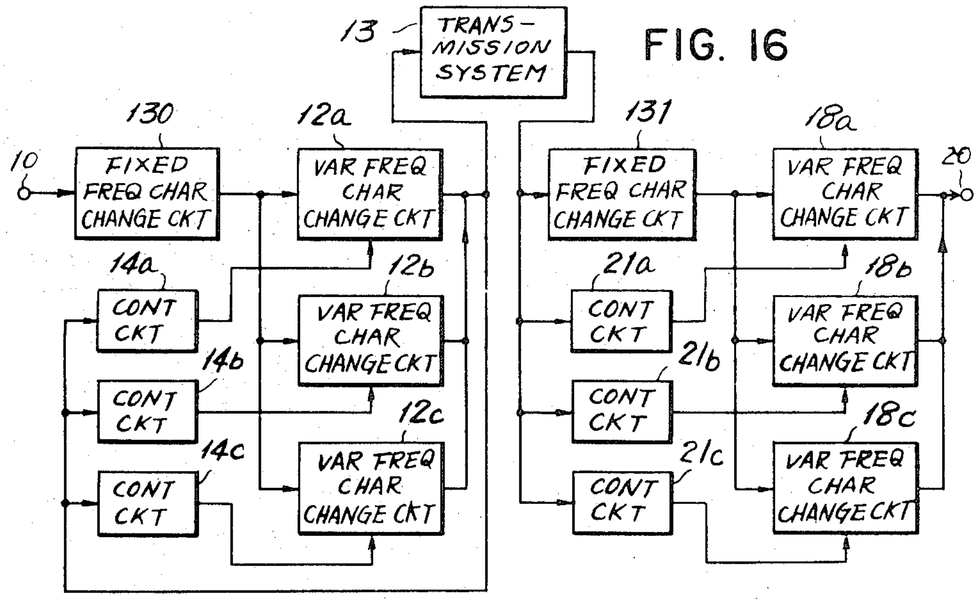
FIG. 16 is a block diagram of a third embodiment of the compression and expansion system according to the invention.
Figure 17A:
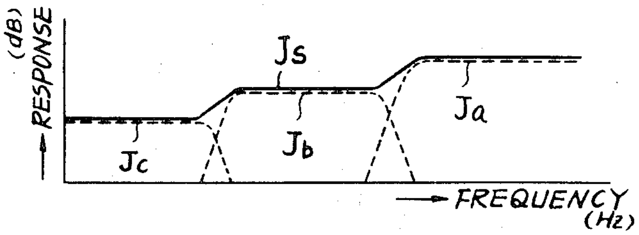
FIGS. 17A to 17D are graphic diagrams respectively showing the frequency-response characteristic of each frequency characteristic change circuit shown in FIG. 16.

A block diagram of a third embodiment of the system according to the invention in which the circuit shown in FIG. 13 is simplified as shown in FIG. 16. In this embodiment, the fixed frequency characteristic change circuits 11a to 11c and 19a to 19c shown in FIG. 13 are respectively replaced by single frequency characteristic change circuits 130 and 131. The frequency characteristic change circuits 130 and 131 respectively have specific fixed frequency-response characteristics, which are synthetic characteristics of the frequency-response characteristics of the circuits 11a to 11c and 19a to 19c. If, for example, the characteristics of the circuits 11a to 11c are curves Ja, Jb and Jc shown by dotted lines in FIG. 17A, the characteristic of the circuit 130 is shown by a characteristic curve Js in full line, which is a synthetic characteristic of the characteristics Ja to Jc. Again, if the characteristics of the circuits 19a to 19c are the ones as shown by characteristic curves Na, Nb and Nc shown in dotted lines in FIG. 17D, which are complementary with the characteristics Ja to Jc, the circuit 131 has a characteristic Ns shown in full line which is a synthetic characteristic of these characteristics Na to Nc. In the present embodiment, the degree of increase in response on the compressor side is large in the curve Ja, medium in Jb and small in Jc, whereas on the expandor side the degree of decrease in response is large in the curve Na, medium in Nb and small in Nc.

Figure 17B:
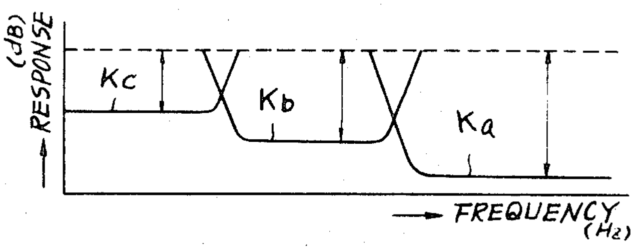
Figure 17C:
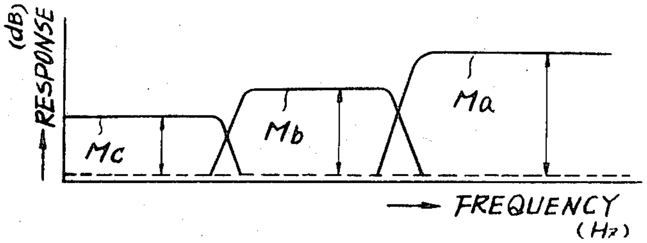
Figures 17D, 21:
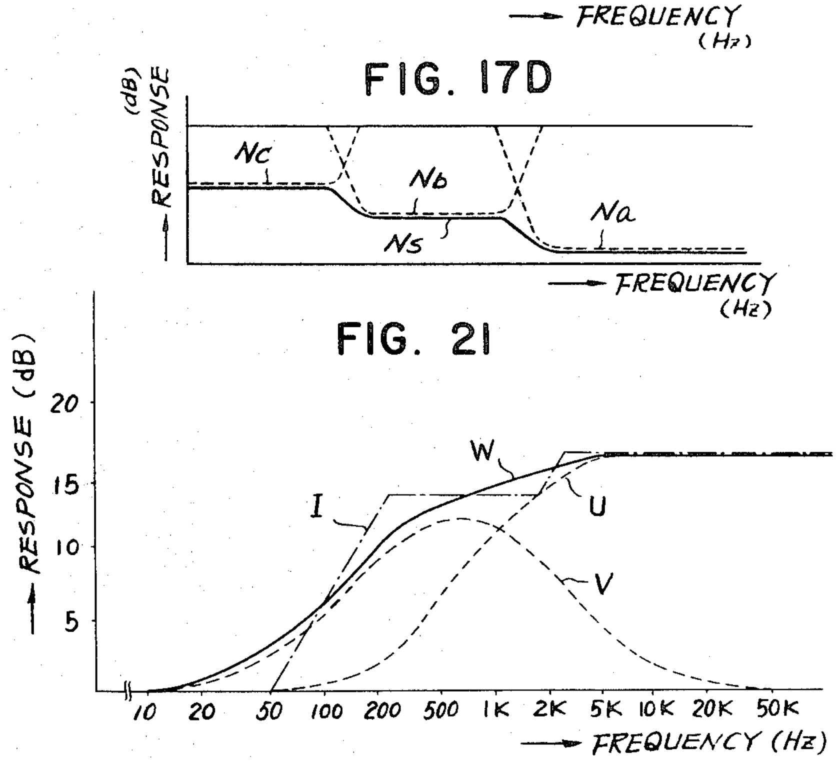
FIG. 21 is a graphic diagram showing frequency-response characteristics of the circuits shown in FIGS. 18 to 20.

The frequency characteristic change circuits 12a to 12c respectively have frequency-response characteristics as shown by curves Ka, Kb and Kc in FIG. 17B. The characteristics Ka to Kc of the circuits 12a to 12c respectively approach decreasing characteristics which are complimentary with the increasing curves Ja to Jc (as the level of the input signal increases), and approach a flat characteristic (as the level of the input signal decreases). The frequency characteristic change circuits 18a to 18c respectively have frequency-response characteristics as shown by curves Ma, Mb and Mc in FIG. 17C. The characteristics of the circuits 18a to 18c approach increasing characteristics which are complimentary with the decreasing curves Na to Nc (as the level of the input signal increases), and approach a flat characteristic (as the level of the input signal decreases).

The above described frequency characteristic change circuits 11a to 11c, 130, 19a to 19c and 131 have specific frequency-response characteristics of a fixed nature and do not vary in accordance with the level of the input signal. Accordingly, the single frequency characteristic change circuit 130 having the characteristic Js performs the same function as the three frequency characteristic change circuits 11a to 11c, connected in parallel with each other, which have the characteristics

*Ja* to *Jc*. Likewise, the single frequency characteristic change circuit 131 having the characteristic Ns performs the same function as the three frequency characteristic change circuits 19*a* to 19*c* connected in parallel with each other which have the characteristics N*a* to N*c*.

Instead of combining a plurality of fixed frequency characteristic change circuits into a single fixed frequency characteristic change circuit having a synthetic characteristic of these plurality of circuits, a plurality of fixed frequency characteristic change circuits may be combined into a plurality of groups. Each group has a synthetic characteristic of the circuits which compose the particular group. In this case, the fixed frequency characteristic change circuits combined into groups are connected in parallel with each other. Further, the fixed frequency characteristic change circuit having a synthetic characteristic may be provided only on the compressor side or the expandor side.

Figure 18:
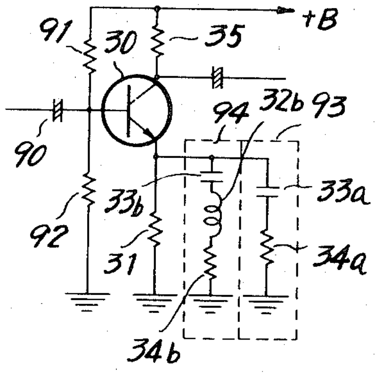
FIGS. 18 to 20 are circuit diagrams respectively showing concrete embodiments of electrical circuits of the fixed frequency characteristic change circuits shown in the block diagram shown in FIG. 16.

Nextly, a concrete embodiment of the frequency characteristic change circuit 130 will be described as having a synthetic frequency-response characteristic of two frequency bands. The circuit shown in FIG. 18 is equivalent to a circuit which consists of the transistor 30 and the circuits 93 and 94 of the circuit shown in FIG. 14. If the values of resistance R1, R2, R3 and R11 of the resistors 31, 34*a*, 34*b* and 35 are selected to be R1 = R11 = 1 KΩ, R2 = 164Ω and R3 = 335Ω, the values of capacitance C1 and C2 of the capacitors 33*a* and 33*b* to be C1 = 0.484 μF and C2 = 2.135 μF and the value of inductance L1 of the coil 32*b* to be L1 = 29.66 mH, the circuit shown in FIG. 18 has a characteristic curve as shown by a full line W in FIG. 21, which is a synthetic characteristic of characteristic curves U and V shown by dotted lines.

This characteristic curve W may be obtained by a circuit including resistors and capacitors. The characteristic of curve W has an asymptote shown by a chain line I. This circuit can be constructed without using coils, which cause problems in a circuit design. Embodiments of this circuit are shown in FIGS. 19 and 20.

Figure 19:
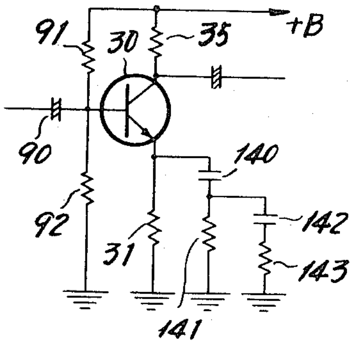
Figure 20:
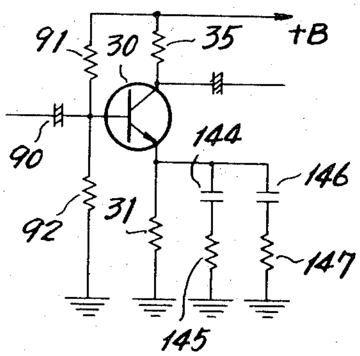

In the circuit shown in FIG. 19, a series circuit of a capacitor 140 and a resistor 141 is connected in parallel with the resistor 31 to the emitter of the transistor 30. Again, a series circuit of a capacitor 142 and a resistor 143 is connected in parallel with a resistor 141. In the circuit shown in FIG. 20, a series circuit of a capacitor 144 and a resistor 145, and a series circuit of a capacitor 146 and a resistor 147, are connected in parallel with the resistor 31 to the emitter of the transistor 30. The frequency-response characteristics of the circuits shown in FIGS. 19 and 20 have the asymptote shown by the curve I in FIG. 21, and nearly approximate the characteristic W of the circuit shown in FIG. 18. According to the circuits of the above described embodiments, the number of circuit elements can be decreased and the cost of manufacture can be reduced due to the simplified construction of these circuits. The foregoing description about the circuit 130 applies to the frequency characteristic change circuit 131.

The frequency band division in the above described second and third embodiments is not necessarily limited to the division into three bands but it may be a division into two or more than four.

Further, this invention is not limited to these embodiments but various variations and modifications may be made without departing from the scope and spirit of the invention.

What we claim is:

1. A compression system comprising first frequency characteristic change means having a specific fixed frequency-response characteristic which increases the level of an input signal in a predetermined frequency band, second frequency characteristic change means in a series connection with said first frequency characteristic change means and having a variable frequency-response characteristic which varies between a characteristic complementary with the frequency-response characteristic of said first frequency characteristic change means and a flat characteristic, control means for generating a control signal in accordance with the level of the input signal, means for supplying the control signal to said second frequency characteristic change means for controlling the characteristic of said second frequency characteristic change means, and means whereby said change approaches said complementary characteristic as said level of the input signal becomes larger and approaches said flat characteristic as said level of the input signal becomes smaller.

2. The compression system as defined in claim 1 in which said control means comprises filter means for filtering a signal of said predetermined frequency band in the input signal, and signal level detection means for detecting the level of the signal filtered by said filter means and thereby generating said control signal.

3. THe compression system as defined in claim 1 in which said first frequency characteristic change means has fixed frequency-response characteristics which increase the level of the input signal in a plurality of different predetermined frequency bands, and said second frequency characteristic change means has variable frequency-response characteristics which vary between characteristics, each of said characteristics being complementary with each corresponding frequency-response characteristic of said first frequency characteristic change means for said plurality of frequency bands and a flat characteristic.

4. The compression system as defined in claim 1 in which said first frequency characteristic change means comprises a plurality of fixed frequency characteristic change means which respectively have fixed frequency-response characteristics which increase the level of the input signal in different predetermined frequency bands, said second frequency characteristic change means comprises a plurality of variable frequency characteristic change means having variable frequency-response characteristics which vary between characteristics each of which is complementary with the frequency-response characteristic of the corresponding fixed frequency characteristic change means and a flat characteristic, and said control means comprises a plurality of control circuit means which apply a control signal to each corresponding variable frequency characteristic change means in accordance with the level of the signal in each corresponding predetermined frequency band.

5. The compression system as defined in claim 1 in which said first frequency characteristic change means comprises a single fixed frequency characteristic change means which has a fixed frequency-response characteristic which increases the level of the input signal in a plurality of different predetermined frequency bands, said second frequency characteristic change means comprises a plurality of variable frequency characteristic change means having variable frequency-response characteristics which vary between characteristics each of which is complimentary with each corresponding frequency-response characteristic of said fixed frequency characteristic change means and a flat characteristic, and said control means comprises a plurality of control circuit means which apply a control signal to each corresponding variable frequency characteristic change means in accordance with the level of the signal in each corresponding predetermined frequency band.

6. An expansion system for expanding the signal compressed by the compression system as defined in claim 1, said expansion system comprising third frequency characteristic change means having a specific fixed frequency-response characteristic which are complementary with said characteristic of said first frequency characteristic change means which decreases the level of the signal in said predetermined frequency band, fourth frequency characteristic change means connected in a series relationship with said third frequency characteristic change means and having a variable frequency-response characteristic which varies between a characteristic which is complementary with the frequency-response characteristic of said third frequency characteristic change means and a flat characteristic, and second control means for generating a control signal in accordance with the level of the signal, means for supplying the control signal to said fourth frequency characteristic change means for controlling the characteristic of said fourth frequency characteristic change means so that it approaches said complementary characteristic as said level of the signal becomes larger and approaches said flat characteristic as said level of the signal becomes smaller.

7. The expansion system as defined in claim 6 in which said second control means comprises filter means for filtering a signal of said predetermined frequency band in the input signal to said means and signal level detection means for detecting the level of the signal filtered by said filter means and thereby generating said control signal.

8. An expansion system for expanding the signal compressed by the compression system as defined in claim 3, said expansion system comprising third frequency characteristic change means having a fixed frequency-response characteristic respectively complementary with the corresponding characteristics in a plurality of mutually different predetermined frequency bands of said first frequency characteristic change means which decrease the level of the signal in said predetermined frequency band, fourth frequency characteristic change means connected in a series relation with said third frequency characteristic change means and having a variable frequency-response characteristic which varies between characteristic limits, each of said limits being complementary with the frequency-response characteristic in the corresponding frequency band of said third frequency characteristic change means and a flat characteristic, and second control means for generating a control signal in accordance with the level of the signal, means for supplying the control signal to said fourth frequency characteristic change means and controlling the characteristic of said fourth characteristic change means so that it approaches said complementary characteristic as said level of the signal becomes larger and approaches said flat characteristic as said level of the signal becomes smaller.

9. The expansion system as defined in claim 8 in which said fourth frequency characteristic change means comprises a plurality of variable frequency characteristic change means each having variable frequency-response characteristics which vary between characteristic limits each of which is complementary with the frequency-response characteristic in the corresponding frequency band of said fixed frequency characteristic change means and a flat characteristic, and said control means comprises a plurality of control circuit means each of which applies a control signal to each corresponding variable frequency characteristic change means in accordance with the level of the signal in each corresponding predetermined frequency band.

10. The expansion system as defined in claim 9 in which each of said control circuit means comprises filter means having a passing band different from each other, and signal level detection means for detecting the level of the signal filtered by said respective filter means and thereby generating said control signal.

11. The expansion system as defined in claim 9 in which said third frequency characteristic change means comprises a plurality of fixed frequency characteristic change means which respectively have fixed frequency-response characteristics which decrease the level of the input signal in different predetermined frequency bands.

12. The expansion system as defined in claim 9 in which said third frequency characteristic change means comprises a single fixed frequency characteristic change means which has a fixed frequncy-response characteristic which decreases the level of the input signal in different predetermined frequency bands.

13. A compression circuit comprising first frequency characteristic change circuit means having a specific fixed frequency-response characteristic which increases the level of an input signal in a predetermined frequency band, second frequency characteristic change circuit means in series connection with said first frequency characteristic change circuit means, said second circuit means having a variable frequency-response characteristic which varies between a characteristic complementary with the frequency-response characteristic of said first frequency characteristic change circuit means and a flat characteristic, control circuit means for generating a control signal in accordance with the level of the input signal, and means for supplying the control signal to said second frequency characteristic change circuit means, said control signal controlling the characteristic of said second frequency characteristic change circuit means so that said characteristics approach said complementary characteristic as said level of the input signal becomes larger and approaches said flat characteristic as said level of the input signal becomes smaller.

14. The compression circuit as defined in claim 13 in which said control circuit means comprises a filter means for filtering a signal of said predetermined frequency band in the input signal, and signal level detection circuit means for detecting the level of the signal filtered by said filter and thereby generating said control signal.

15. The compression circuit as defined in claim 13 which further comprises a transistor the emitter of which is grounded through an emitter resistor, and in which said first frequency characteristic change circuit means includes a series circuit of a capacitor and a resistor connected in parallel with said emitter resistor, and said second frequency characteristic change circuit means includes a capacitor and a control element connected in series with each other between the collector of said transistor and the ground, said control element varying its impedance responsive to an application thereto of the control signal voltage from said control circuit.

16. The compression circuit as defined in claim 13 in which said first frequency characteristic change circuit means comprises a plurality of fixed frequency characteristic change circuit means which respectively have fixed frequency-response characteristics which increase the level of the input signal in different predetermined frequency bands, said second frequency characteristic change circuit means comprises a plurality of variable frequency characteristic change circuit means respectively having variable frequency-response characteristics which vary between characteristics, each of which is complementary with the frequency-response characteristic of the corresponding fixed frequency characteristic change circuit and a flat characteristic, said control circuit means comprises a plurality of control circuit means, each of which generates a control signal voltage in accordance with the level of the signal in each corresponding predetermined frequency band, and said each variable frequency characteristic change circuit means includes a control element which varies its impedance responsive to an application thereto of the control signal voltage from the corresponding control circuit.

17. The compression circuit as defined in claim 13 in which said first frequency characteristic change circuit means comprises a single fixed frequency characteristic change circuit means which has a fixed frequency-response characteristic which increases the level of the input signal in a plurality of different predetermined frequency bands, said second frequency characteristic change circuit means comprises a plurality of variable frequency characteristic change circuit means respectively having variable frequency-response characteristics which vary between characteristics each of which is complementary with the frequency-response characteristic of the corresponding frequency band of said fixed frequency characteristic change circuit means and a flat characteristic, and said each variable frequency characteristic change circuit means includes a control element which varies its impedance in response to an application thereto of the control signal voltage from the corresponding control circuit.

18. An expansion circuit for expanding the signal compressed by the compression circuit as defined in claim 6, said expansion circuit comprising a third frequency characteristic change circuit means having a specific fixed frequency-response characteristic which is complementary with said characteristic of said first frequency characteristic change means which decreases the level of the signal in said predetermined frequency band, a fourth frequency characteristic change circuit means connected in a series relation with said third frequency characteristic change circuit and having a variable frequency-response characteristic which varies between a characteristic which is complementary with the frequency-response characteristic of said third frequency characteristic change circuit and a flat characteristic, and a second control circuit means for generating a control signal in accordance with the level of the input signal, supplying the control signal to said fourth frequency characteristic change circuit means and controlling the characteristic of said fourth frequency characteristic change circuit means so that it approaches said complementary characteristic as said level of the signal becomes larger and approaches said flat characteristic as said level of the signal becomes smaller.

19. The expansion circuit as defined in claim 18 in which said second control circuit comprises a filter for filtering a signal of said predetermined frequency band in the input signal to said circuit and a signal level detection circuit for detecting the level of the signal filtered by said filter and thereby generating said control signal.

20. The expansion circuit as defined in claim 18 which further comprises a transistor the emitter of which is grounded through an emitter resistor, and in which said third frequency characteristic change circuit means includes a capacitor and a resistor connected in series between the collector of said transistor and the ground, said fourth frequency characteristic change circuit means includes a series circuit of a capacitor and a control element which varies its impedance by an application thereto of the control signal voltage from said second control circuit, said series circuit being connected in parallel with said emitter resistor of said transistor.

21. An expansion circuit for expanding the signal compressed by the compressing circuit as defined in claim 13, said expansion circuit comprising a third frequency characteristic change circuit means having fixed frequency-response characteristics respectively complementary with the corresponding characteristics in a plurality of mutually different predetermined frequency bands of said first frequency characteristic change circuit means which decreases the level of the signal in said predetermined frequency band, a fourth frequency characteristic change circuit means connected in a series relation with said third frequency characteristic change circuit means and having variable frequency-response characteristics which vary between characteristic limits each of which is complementary with the frequency-response characteristic in the corresponding frequency band of said third frequency characteristic change circuit means and a flat characteristic, and a second control circuit means for generating a control signal in accordance with the level of the signal, means for supplying the control signal to said fourth frequency characteristic change circuit means for controlling the characteristic of said fourth frequency characteristic change circuit so that it approaches said complementary characteristic as said level of the signal becomes larger and approaches said flat characteristic as said level of the signal becomes smaller.

22. The expansion circuit as defined in claim 21 in which said third frequency characteristic change circuit means comprised a plurality of fixed frequency characteristic change circuits which respectively have fixed frequency-response characteristics which decrease the level of the input signal in different predetermined frequency bands.

23. The expansion circuit as defined in claim 21 in which said third frequency characteristic change circuit means comprises a single fixed frequency characteristic change circuit means which has a fixed frequency-response characteristic which decreases the level of the input signal in different predetermined frequency bands.

24. The expansion circuit as defined in claim 21 in which said fourth frequency characteristic change circuit means comprises a plurality of variable frequency characteristic change circuit means, each having variable frequency-response characteristics which vary between characteristic limits each of which is complementary with the frequency-response characteristic in the corresponding frequency band of said third frequency characteristic change circuit means and a flat characteristic, said control circuit means comprising a plurality of control circuits each of which generates a control signal voltage in accordance with the level of signal in the corresponding predetermined frequency band, and each of said plurality of variable frequency characteristic change circuit means includes a control element which varies its impedance by an application thereto of the control voltage from the corresponding control circuit of said plurality of control circuits.

25. The expansion circuit as defined in claim 24 in which each of said control circuits comprises a filter having a passing band different from each other and a signal level detector for detecting the level of the signal filtered by said filter and thereby generating said control signal.

26. A compression and expansion system comprising first frequency characteristic change means having a specific fixed frequency-response characteristic which increases the level of an input signal in a predetermined frequency band, second frequency characteristic change means connected in a series relation with said first frequency characteristic change means and having a variable frequency-response characteristic which varies between a characteristic which is complementary with the frequency-response characteristic of said first frequency characteristic change means and a flat characteristic, first control means for generating a control signal in accordance with the level of the input signal, means for supplying the control signal to said second frequency characteristic change means for cntrolling the characteristic of said second frequency characteristic change means so that it approaches said complementary characteristic as said level of the input signal becomes larger and approaches said flat characteristic as said level of the input signal becomes smaller, transmission system means for transmitting the signal compressed in said first and second frequency characteristic change means, third frequency characteristic change means having a specific fixed frequency-response characteristic complementary with said characteristic of said first frequency characteristic change means, said complementary characteristic decreasing the level of the signal transmitted through said transmission system means in said predetermined frequency band, fourth frequency characteristic change means connected in a series relationship with said third frequency characteristic change means and having a variable frequency-response characteristic which varies between a characteristic complementary with the frequency-response characteristic of said third frequency characteristic change means and a flat characteristic, and second control means for generating a control signal in accordance with the level of the signal, means for supplying the control signal to said fourth frequency characteristic change means for controlling the characteristic of said fourth frequency characteristic change means so that it approaches said complementary characteristic as said level of the signal becomes larger and approaches said flat characteristic as said level of the signal becomes smaller.

27. A compression and expansion system comprising compression means for independently varying the level of an electrical signal in each of a plurality of predetermined frequency bands, said compression means varying the level of said electrical signal to compress said signal in a fixed frequency-response relationship, expansion means for variably changing the level of said compressed electrical signal in each of said frequency bands in a manner which is complementary to the varying by said compression means, and means whereby the magnitude of the variance by said expansion means becomes larger as the level of the electrical signal becomes larger and becomes smaller as the level of the electrical signal becomes smaller.

* * * * *